US010356326B2

(12) United States Patent
Kudo

(10) Patent No.: US 10,356,326 B2
(45) Date of Patent: Jul. 16, 2019

(54) CAMERA

(71) Applicant: OLYMPUS CORPORATION, Hachioji-shi, Tokyo (JP)

(72) Inventor: Yasunori Kudo, Tokyo (JP)

(73) Assignee: Olympus Corporation, Tokyo (JP)

( * ) Notice: Subject to any disclaimer, the term of this patent is extended or adjusted under 35 U.S.C. 154(b) by 16 days.

(21) Appl. No.: 15/423,787

(22) Filed: Feb. 3, 2017

(65) Prior Publication Data

US 2017/0230583 A1   Aug. 10, 2017

(30) Foreign Application Priority Data

Feb. 10, 2016   (JP) ................................ 2016-023776

(51) Int. Cl.
| | | |
|---|---|---|
| *H04N 5/232* | (2006.01) | |
| *H04N 5/235* | (2006.01) | |
| *H04N 5/238* | (2006.01) | |
| *G03B 13/00* | (2006.01) | |
| *G02B 9/02* | (2006.01) | |
| *G02B 7/09* | (2006.01) | |
| *G02B 7/28* | (2006.01) | |

(52) U.S. Cl.
CPC .......... *H04N 5/23293* (2013.01); *G02B 7/09* (2013.01); *G02B 7/28* (2013.01); *H04N 5/232* (2013.01); *H04N 5/238* (2013.01); *H04N 5/2351* (2013.01); *H04N 5/2353* (2013.01); *H04N 5/2354* (2013.01); *H04N 5/23212* (2013.01); *H04N 5/23245* (2013.01)

(58) Field of Classification Search
CPC ............... H04N 5/232; H04N 5/23293; H04N 5/23212; H04N 5/23245; H04N 5/2353; H04N 5/2351; H04N 5/2354; H04N 5/238; G03B 7/00; G03B 9/02; G03B 2213/00–025; G03B 13/00–16; G02B 7/28; G02B 7/09
USPC ...... 348/333.11, 333.01–333.13, 220.1, 362, 348/221.1, 367, 368; 396/373–386, 374, 396/378
See application file for complete search history.

(56) References Cited

U.S. PATENT DOCUMENTS 9,116,417 B2 * 8/2015 Morita ................... G03B 17/14
                                                                    396/529
9,557,692 B2 * 1/2017 Imamura ............ H04N 5/23209
                                                                    348/360
(Continued)

FOREIGN PATENT DOCUMENTS

JP        2007-189481        7/2007

*Primary Examiner* — Marly S Camargo
(74) *Attorney, Agent, or Firm* — John C. Pokotylo; Pokotylo Patent Services

(57) ABSTRACT

A camera includes an image pickup device configured to receive a light flux passing through a photographing lens and to convert the light flux into an electric signal, a display device configured to perform a live-view display on the basis of the electric signal output from the image pickup device, an aperture driving actuator configured to adjust a light amount passing through the photographing lens, and a controller configured to control a stop timing of the live-view display performed before an exposure at the time of a still-image photography on the display device in accordance with an operation condition of the aperture driving actuator at the time of the still-image photography.

16 Claims, 19 Drawing Sheets

(56) References Cited

U.S. PATENT DOCUMENTS

| | | | |
|---|---|---|---|
| 9,843,710 B2* | 12/2017 | Hannan | H04N 5/23212 |
| | | | 348/349 |
| 2002/0196348 A1* | 12/2002 | Kubo | H04N 5/772 |
| | | | 348/220.1 |
| 2007/0165133 A1 | 7/2007 | Shimuzu et al. | |
| 2011/0298954 A1* | 12/2011 | Nakaseko | H04N 5/343 |
| | | | 348/296 |
| 2017/0094200 A1* | 3/2017 | Saegusa | H04N 5/351 |
| | | | 348/222.1 |

* cited by examiner

| CAMERA OPERATION | CONVENTIONAL EXAMPLE | CONVENTIONAL EXAMPLE | FIRST EMBODIMENT |
|---|---|---|---|
| STILL-IMAGE EXPOSURE | | | |
| APERTURE DRIVE<br>STILL-IMAGE AV ↓ LIVE-VIEW AV | | | |
| LIVE-VIEW DISPLAY AFTER APERTURE DRIVE | | | |
| APERTURE DRIVE<br>LIVE-VIEW AV ↓ STILL-IMAGE AV | | | |
| STILL-IMAGE EXPOSURE | | | |
| APERTURE DRIVE<br>STILL-IMAGE AV ↓ LIVE-VIEW AV | | | |
| LIVE-VIEW DISPLAY AFTER APERTURE DRIVE | | | |
| APERTURE DRIVE<br>LIVE-VIEW AV ↓ STILL-IMAGE AV | | | |
| STILL-IMAGE EXPOSURE | | | |
| | (A) | (B) | (C) |

F I G. 1 0

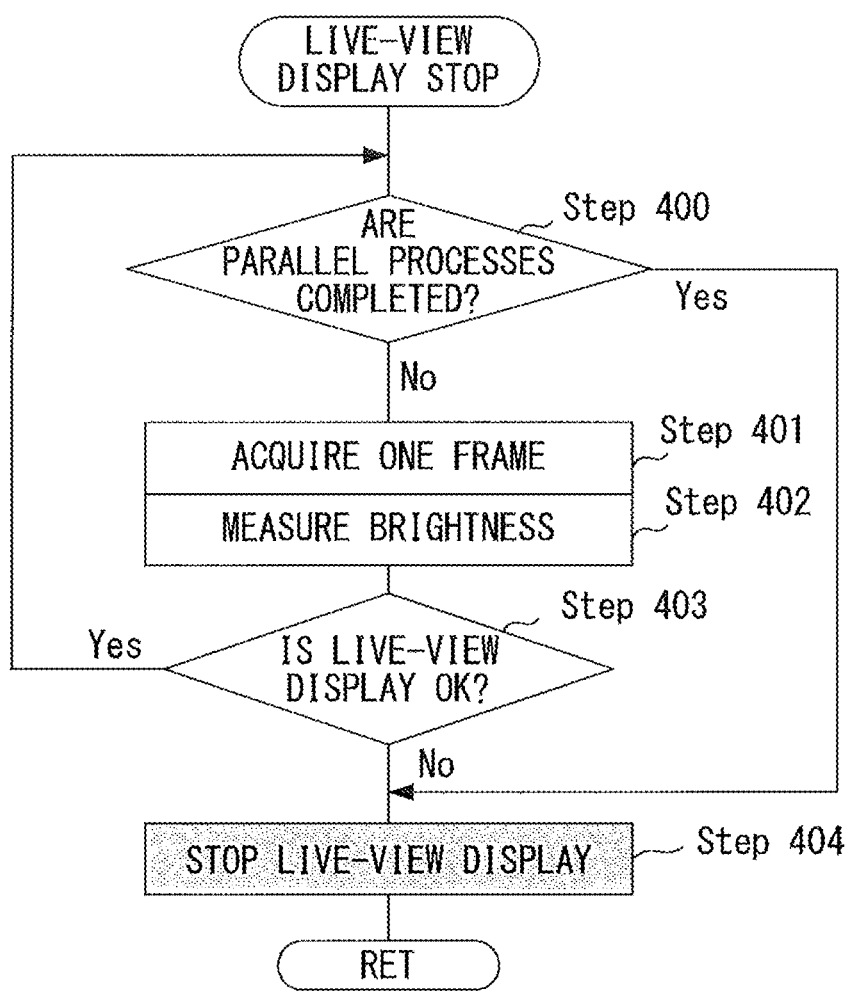
F I G. 15

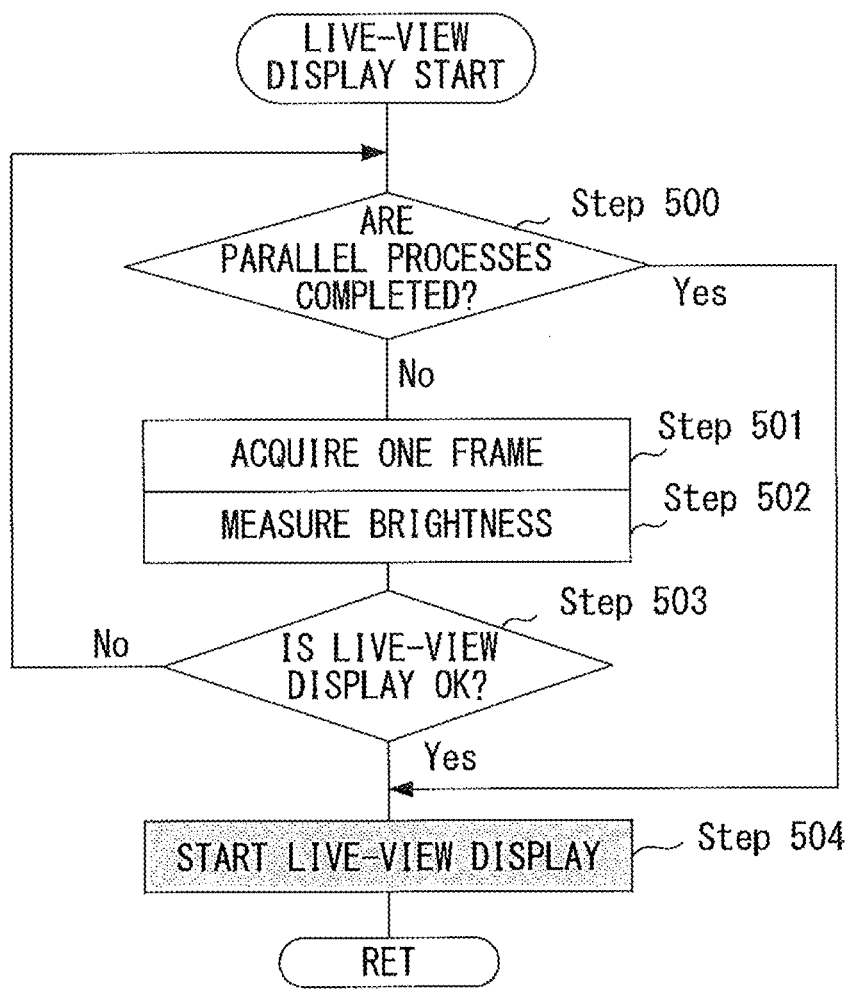
F I G. 16

CAMERA

CROSS-REFERENCE TO RELATED APPLICATIONS

This application is based upon and claims the benefit of priority of the prior Japanese Patent Application No. 2016-23776, filed on Feb. 10, 2016, the entire contents of which are incorporated herein by reference.

FIELD

The present invention relates to a camera capable of a live-view display.

BACKGROUND

In a conventional digital camera, while confirming a subject using a live-view display of a display device such as a rear monitor, an EVF (Electronic View Finder), etc., photography is performed.

A user captures the subject in a screen frame while viewing a display device in which the live-view display is performed, and depresses a release button to thereby photograph the target subject as a still image.

In a general digital camera, the live-view display and the still-image photography are realized using one image pickup device, an optical system, etc. Therefore, the live-view display cannot be performed while an image is acquired using the still-image photography. As a result, a period (hereinafter, referred to as a blackout period) is present in which a display of the display device is blacked out.

Examples of situations in which the live-view display cannot be performed include a case in which a mechanical shutter that controls an exposure time is closed, a case in which the image pickup device is in a still-image acquisition state and an image in which the live-view display is performed cannot be output, a case in which the exposure is being changed as in an aperture driving, and the like.

In Japanese Laid-open Patent Publication No. 2007-189481, for example, a technique is disclosed in which a through-image (an image in which the live view display is performed) is frozen during the aperture driving in the live-view display.

Conventionally, in the live-view display, during the aperture driving, control is performed such that the through-image is frozen or blacked out, or the aperture is slowly (some time later) driven.

SUMMARY

According to one aspect of the present invention, there is provided a camera including an image pickup device configured to receive a light flux passing through a photographing lens and to convert the light flux into an electric signal, a display device configured to perform a live-view display on the basis of the electric signal output from the image pickup device, an aperture driving actuator configured to adjust a light amount passing through the photographing lens, and a controller configured to control a stop timing of the live-view display performed before an exposure at the time of a still-image photography on the display device in accordance with an operation condition of the aperture driving actuator at the time of the still-image photography or in accordance with a brightness of an image based on an output of the image pickup device.

According to another aspect of the present invention, there is provided a camera including an image pickup device configured to receive a light flux passing through a photographing lens and to convert the light flux into an electric signal, a display device configured to perform a live-view display on the basis of the electric signal output from the image pickup device, an aperture driving actuator configured to adjust a light amount passing through the photographing lens, and a controller configured to control a start timing of the live-view display performed after an exposure at the time of a still-image photography on the display device in accordance with an operation condition of the aperture driving actuator at the time of the still-image photography or in accordance with a brightness of an image based on an output of the image pickup device.

BRIEF DESCRIPTION OF DRAWINGS

FIG. 10 illustrates, in time sequence, display examples of an EVF or a rear liquid crystal monitor during the still-image photographing processing of the camera according to the first embodiment.

FIG. 15 is a flowchart illustrating one example of a live-view display stop processing of the camera according to the second embodiment.

FIG. 16 is a flowchart illustrating one example of a live-view display start processing of the camera according to the second embodiment.

DESCRIPTION OF EMBODIMENTS

Hereinafter, embodiments of the present invention will be described in detail with reference to the accompanying drawings.

<First Embodiment>

Figure 1:
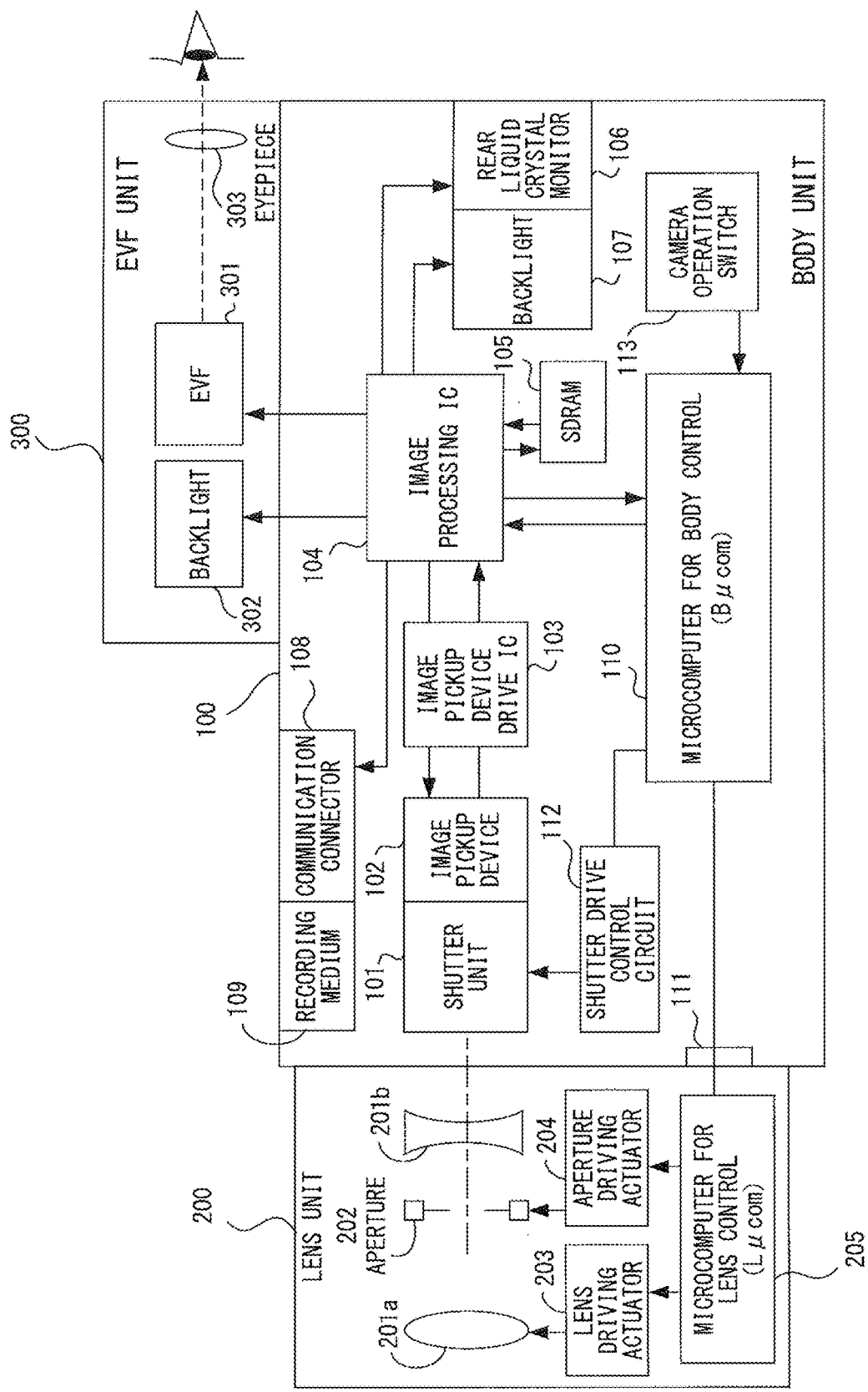
FIG. 1 illustrates a configuration example of a camera according to a first embodiment.

FIG. 1 illustrates a configuration example of a camera according to a first embodiment of the present invention.

As illustrated in FIG. 1, the camera according to the present embodiment includes a body unit 100, a lens unit 200, and an EVF unit 300.

The lens unit 200 is freely attachable to and detachable from the body unit 100 through a lens mount (not illustrated) provided on the front surface of the body unit 100, and is exchangeable in this camera.

The lens unit 200 includes photographing lenses 201 (201a and 201b), an aperture 202, a lens driving actuator 203, an aperture driving actuator 204, and a microcomputer for lens control (hereinafter, referred to as an 'Lµ com') 205.

The photographing lenses 201 are driven in an optical axis direction using a DC (Direct Current) motor (not illustrated) included in the lens driving actuator 203. The aperture 202 is driven using a stepping motor (not illustrated) included in the aperture driving actuator 204. An amount of light passing through the photographing lenses 201 is adjusted using the driving of the aperture 202 through this aperture driving actuator 204.

The Lµ com 205 drives and controls respective units within the lens unit 200, such as the lens driving actuator 203, the aperture driving actuator 204, and the like. The Lµ com 205 is electrically connected to the following microcomputer for body control 110 via the following communication connector 111. Further, the Lµ com 205 can transmit and receive various types of data to and from the microcomputer for body control 110 and is controlled using the microcomputer for body control 110.

The body unit 100 includes the following configuration.

A light flux (a subject image passing through an optical system) from a subject (not illustrated) that is incident on the body unit 100 through the photographing lenses 201 and the aperture 202 within the lens unit 200 passes through the shutter unit 101 in an open state and is formed on an image pickup device 102. The shutter unit 101 is a focal-plane shutter unit provided on an optical axis of the lens unit 200. The image pickup device 102 photoelectrically converts the formed subject image into an analog electric signal. A photoelectric conversion using the image pickup device 102 is controlled using an image pickup device drive IC (Integrated Circuit) 103. The image pickup device drive IC 103 converts the analog electric signal photoelectrically converted using the image pickup device 102 into a digital electric signal that is processed by an image processing IC 104. The image processing IC 104 converts the digital electric signal converted by the image pickup device drive IC 103 into an image signal.

To the image processing IC 104 are connected the image pickup device 102, the image pickup device drive IC 103, an SDRAM (Synchronous Dynamic Random Access Memory) 105 as a storage area, a rear liquid crystal monitor 106, a backlight 107 that irradiates light onto a liquid crystal within the rear liquid crystal monitor 106 from the rear, a recording medium 109 via a communication connector 108, and the like, and they are configured so as to provide an electronic record displaying function along with an electronic imaging function.

The recording medium 109 is an external recording medium such as a semiconductor memory card of various types, an external hard disk drive (HDD), or the like, and is mounted so as to communicate with the body unit 100 via the communication connector 108 and so as to be exchanged with each other.

Further, to the image processing IC 104, the microcomputer for body control (hereinafter, referred to as a Bµ com) 110 that controls each unit within the body unit 100 is also connected. The Bµ com 110 has a timer etc. (not illustrated) that measures a photographing interval at the time of continuous photographing, and has functions of counting, mode setting, detection, determination, calculation, and the like in addition to control of the whole operation of the camera. For example, the Bµ com 110 displays a notice of an operation state of the camera with respect to a user (photographer) on the rear liquid crystal monitor 106. To the Bµ com 110, the communication connector 111, a shutter drive control circuit 112, a camera operation switch (SW) 113, a power circuit (not illustrated) and the like are connected.

Further, the lens unit 200 is mounted on the body unit 100, and thereby the Bµ com 110 and the Lµ com 205 are electrically connected to each other via the communication connector 111 so as to be in communication with each other. Further, the Lµ com 205 operates as the camera while dependently cooperating with the Bµ com 110.

The shutter drive control circuit 112 controls movements of a front curtain and a rear curtain, which are not illustrated, in a shutter unit 101, and transmits and receives to and from the Bµ com 110 a signal for controlling an open and close operation of the shutter unit 101 and a signal at the time of completion of the traveling of the front curtain.

The camera operation switch 113 is composed of a switch group including operation buttons necessary for operation of the camera by the user, such as a release switch for directing execution of a photographing operation, a mode change switch for switching a photographing mode to a continuous photographing mode, a normal photographing mode, etc., a power switch for switching the on/off state of a power source, and the like.

Further, the power circuit (not illustrated) converts a voltage of a battery (not illustrated) as a power source to a voltage necessary to supply each circuit unit of the camera.

The EVF unit 300 includes an EVF (liquid crystal EVF) 301, a backlight 302 for irradiating light onto the EVF 301 from behind, and an eyepiece 303, and the user can view, for example, a live-view display through the eyepiece 303.

Further, the camera according to the present embodiment has a configuration in which the live-view display can be displayed either on the rear liquid crystal monitor 106 or on the EVF 301, and the user can select the live-view display on either one of the two in accordance with photographing conditions.

Next, operations of the camera according to the present embodiment will be described.

A photographing operation and a live view operation will be described first.

In the camera according to the present embodiment, the photographing operation is performed as follows.

First, the image processing IC 104 is controlled using the Bµ com 110 and image data (a digital electric signal) is input from the image pickup device 102 and the image pickup device drive IC 103 to the image processing IC 104. Further, the image processing IC 104 stores this image data in the SDRAM 105 that is a memory for temporal storage. Also, the SDRAM 105 is used as a work area for performing image processing by the image processing IC 104. Further, the image processing IC 104 can perform the image processing for converting this image data to JPEG (Joint Photographic Experts Group) data and store the JPEG data in the recording medium 109.

When receiving a signal for drive-controlling the shutter unit 101 from the Bμ com 110, the shutter drive control circuit 112 controls the shutter unit 101 and instructs the shutter unit 101 to perform the open and close operation. At the same time as the above, at a predetermined timing, the shutter drive control circuit 112 outputs a light emission signal for emitting a flash to a microcomputer for flash control (not illustrated) and a light-emission control circuit via a communication connector for a flash (not illustrated) from the Bμ com 110. At this time, predetermined image processing on image data output from the image pickup device 102 and the image pickup device drive IC 103 is performed and the image data is stored in the recording medium 109, thereby completing the photographing operation.

In the camera according to the present embodiment, the live view operation is performed as follows.

The light flux from the photographing lenses 201 is introduced to the image pickup device 102. The image pickup device 102 continuously performs exposure, for example, at a rate of about 60 sheets per second (60 frames/second). At this time, the image pickup device 102 converts the image data output from the image pickup device 102 and the image pickup device drive IC 103 into a video signal using the image processing IC 104 to thereby give the video signal to the rear liquid crystal monitor 106. This process permits a moving image of the subject to be displayed on the rear liquid crystal monitor 106. Alternatively, the video signal is given to the EVF 301, thereby displaying the moving image of the subject on the EVF 301. Such a display is referred to as the 'live-view display' and is well known. Hereinafter, the 'live view' or the 'live-view display' may be occasionally abbreviated as 'LV (Live View)'.

At the time of LV operations, the light flux from the photographing lenses 201 is always introduced to the image pickup device 102. Therefore, the image processing IC 104 can be instructed to perform a photometry processing of a brightness of the subject or a known range-finding processing on the subject on the basis of the image data output from the image pickup device 102 and the image pickup device drive IC 103. Hereinafter, as described above, the photometry processing of the brightness of the subject, and the range-finding processing and automatic focusing processing on the subject performed using the image processing IC 104 and the Bμ com 110 are supposed to be referred to as 'LV photometry' and 'LVAF (Auto Focus)', respectively, on the basis of the image data output from the image pickup device 102 and the image pickup device drive IC 103.

Next, a basic operation of the camera according to the present embodiment will be described.

Figure 2:
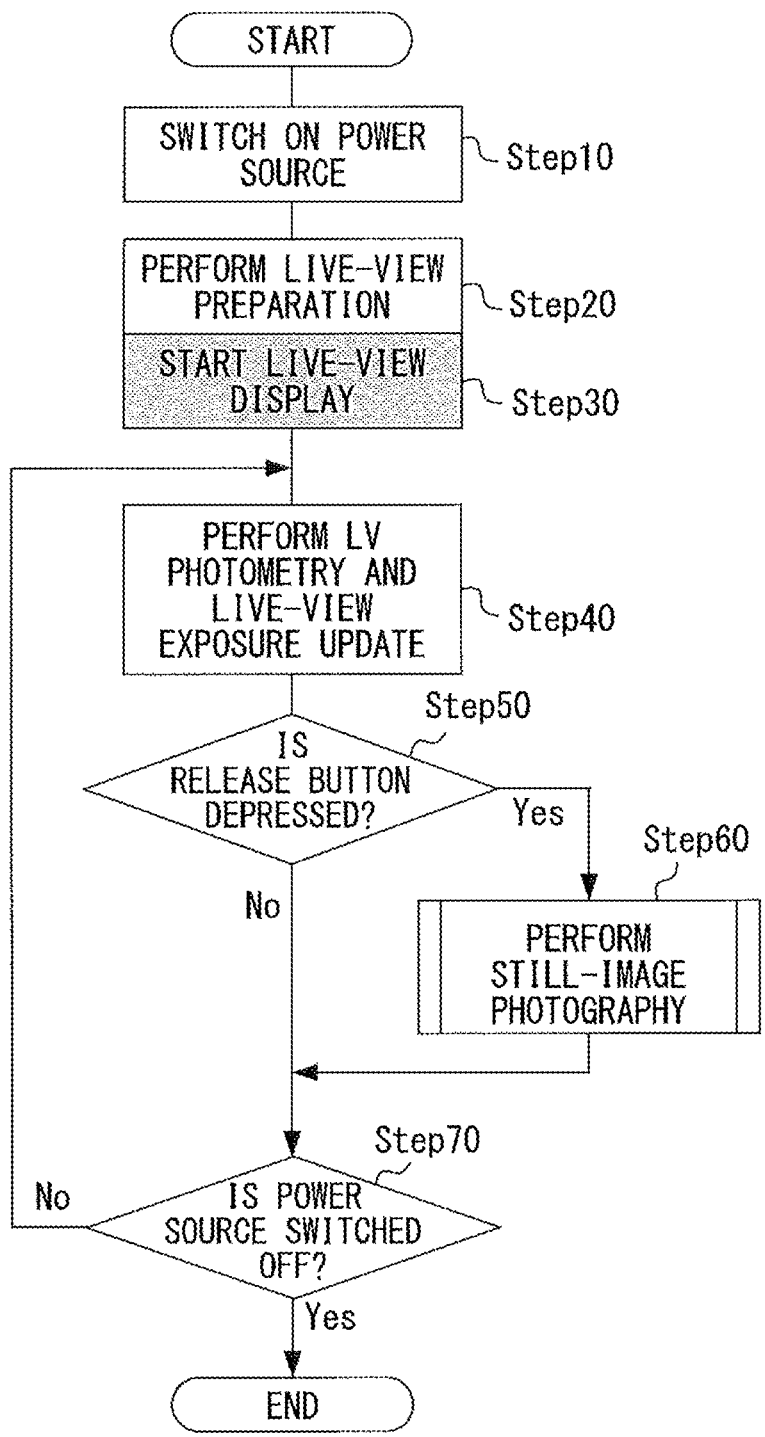
FIG. 2 is a flowchart illustrating one example of a basic operation of the camera according to the first embodiment.

FIG. 2 is a flowchart illustrating one example of the basic operation.

In FIG. 2, first, in step 10, the user operates the camera operation switch 113 and switches ON a power source to thereby supply power to an electric circuit within the camera. As a result, the Bμ com 110, the image processing IC 104, the image pickup device drive IC 103, the image pickup device 102, etc. start up and initialization of the image pickup device 102, the lens unit 200, the EVF unit, etc. is performed.

In the following step 20, preparation processing of the live-view display is performed. In the live-view display, a light amount of a subject image formed by photographing lenses 201 is adjusted on the basis of sensitivity and an electronic shutter speed of the image pickup device 102 and an aperture position within the lens unit 200; however, luminance of the subject is not known at the time of starting the live-view display. Therefore, in the preparation processing of this live-view display, LV photometry is performed on the basis of an output (imaging output) from the image pickup device 102 and image pickup device drive IC 103 through setting of the predetermined sensitivity and electronic shutter speed, and the predetermined aperture position and the exposure of a start frame of the live-view display is determined using the acquired photometric value.

In the following step 30, the live-view display is started. Thereby, the user views an image through the eyepiece 303 of the EVF unit 300 to thereby confirm the subject image, and views the rear liquid crystal monitor 106 to thereby confirm the subject image.

In the following step 40, the LV photometry is performed and control of an exposure update is performed so that an exposure of the live-view display coincides with a target exposure on the basis of the acquired photometric value (the LV photometry and control of the live view exposure update).

In the following step 50, it is determined whether the release button is depressed (whether the release button is switched ON).

In the determination in step 50, if it is determined that the release button is depressed (Yes in step 50), the following still-image photographing processing is performed in the following step 60 and the process proceeds to step 70.

On the other hand, in the determination in step 50, if it is determined that the release button is not depressed (No in step 50), the process proceeds to step 70.

In step 70, it is determined whether the power source is switched OFF.

In the determination in step 70, if it is determined that the power source is switched OFF (Yes in step 70), the process ends.

On the other hand, in the determination in step 70, if it is determined that the power source is not switched OFF (No in step 70), the process returns to step 40.

On the basis of the basic operations illustrated in FIG. 2 as described above, as long as the release button is not depressed in a state in which the power source is switched ON, step 40 (the LV photometry and the live view exposure update) is regularly repeated and the live view exposure update is controlled so that the exposure of the live-view display always coincides with the target exposure.

Next, the still-image photographing processing in step 60 of FIG. 2 will be described in detail.

First, before the still-image photographing processing in step 60 is described, a difference between the still-image photographing processing in step 60 and the still-image photographing processing conventionally performed is made clear, and therefore the conventional still-image photographing processing will be described.

Figure 3:
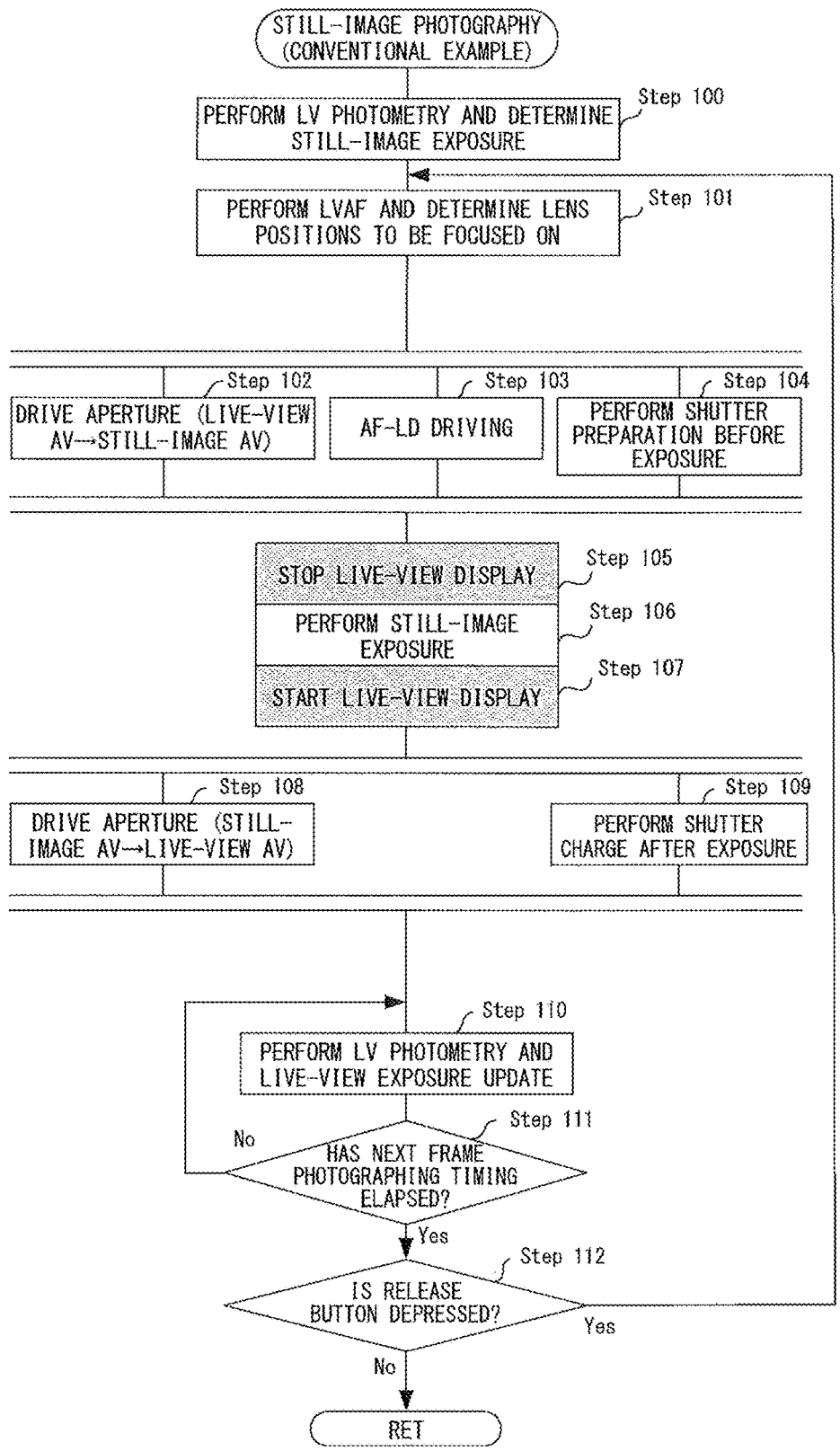
FIG. 3 is a flowchart illustrating one example of a conventional still-image photographing processing.

FIG. 3 is a flowchart illustrating one example of the conventional still-image photographing processing.

Suppose herein that the conventional still-image photographing processing illustrated in FIG. 3 is performed in place of the still-image photographing processing in step 60 of FIG. 2. The conventional still-image photographing processing is controlled so that the live-view display is performed during a time other than the exposure time (still-image exposure).

If the release button is depressed (Yes in step 50 of FIG. 2), photometry of the subject is first performed and exposure conditions at the time of the still-image photography are determined on the basis of the acquired photometric value in step 100 as illustrated in FIG. 3. Examples of the exposure conditions include an Av (Aperture value) at the time of the still-image photography, the shutter speed (shutter speed of the shutter unit 101), and the imaging sensitivity.

In the following step 101, the LVAF is performed and positions of lenses (positions of the photographing lenses 201) to be focused on the subject are detected (determined).

The processes of the following steps 102, 103, and 104 are performed in parallel.

In FIG. 3, it is illustrated that a plurality of processes described between two respective lines on the upper side and the lower side are parallel processing, and after all of the plurality of processes end, the process proceeds to a process after the plurality of processes (other figures are also the same as FIG. 3).

In step 102, the aperture 202 is driven from the aperture position at the time of the live-view display to the aperture position at the time of the still-image photography. As a difference is larger between the aperture value (Av) at the time of the live-view display and the aperture value (Av) at the time of the still-image photography, more time is required until completion of the aperture driving. In order to perform a change in the light amount for several steps, for example a time of about several tens of milliseconds is required, and therefore the exposure of the live-view display becomes unstable during the aperture driving.

In step 103, the photographing lenses 201 are driven to the lens position determined in step 101 (hereinafter also referred to as the 'LD driving'). Further, when the photographing lenses 201 are driven greatly, an image may be in a defocusing state in which the live-view display is performed.

In step 104, shutter preparation processing before the exposure is performed. Further, the shutter unit 101 is in a fully open condition during the live-view display. In the still-image photography, an operation is performed in which the shutter unit 101 is shielded using a front curtain before the exposure, the front curtain is opened at a start of the exposure, and a rear curtain of the shutter unit 101 is closed at the completion of the exposure time. Accordingly, in step 104, an operation is performed in which the front curtain of the shutter unit 101 is closed in preparation to photograph the still image (exposure).

In the following step 105, the live-view display is stopped and the imaging mode is switched, for example, from a driving of 60 frame/second to control for the still-image exposure.

In the following step 106, the still-image exposure is performed. More specifically, the shutter unit 101 is put into an open state during a period corresponding to the shutter speed. After the completion of the exposure, the output signal of the image pickup device 102 via the image pickup device drive IC 103 is transmitted to the image processing IC 104 to be converted to an image. The converted image is transmitted to the recording medium 109.

In the following step 107, the image pickup device 102 and image pickup device drive IC 103 in which the still image output has been completed is switched to a driving mode of the live-view display to start the live-view display. Further, the electronic shutter speed and imaging sensitivity at this time is set on the basis of the luminance of the subject acquired by the LV photometry before the exposure.

The processes of the following steps 108 and 109 are performed in parallel.

In step 108, the aperture 202 is driven from the aperture position at the time of the still-image photography to the aperture position at the time of the live-view display. As described above, as a difference is larger between both of the aperture values (Av), the exposure of the live-view display becomes more unstable during the aperture driving.

In step 109, an operation is performed in which the shutter unit 101 that is driven for the still-image exposure is returned to a state before the exposure and the shutter unit 101 is put into a fully open state for a restarting of the live-view display. This operation is an operation to be generally called a shutter charge in a focal plane shutter device. In this operation, an operation is performed in which a rear curtain that has shielded the image pickup device 102 through the exposure operation opens. During the driving of the rear curtain, the image pickup device 102 transits from a light shielding state to an exposure state. Further, the live-view display transits from a dark display (blackout) to a bright display and the transition time is shorter than the aperture driving time.

In the following step 110, the LV photometry is performed and control of the exposure update is performed so that the exposure of the live-view display coincides with the target exposure on the basis of the acquired photometric value (the LV photometry and control of the live view exposure update).

In the following step 111, it is determined whether the next frame photographing timing has elapsed in order to perform a continuous photographing at a set continuous photographing speed in the case of the continuous photographing.

In the determination in step 111, if it is determined that the next frame photographing timing has not elapsed (No in step 111), the process returns to step 110.

On the other hand, in the determination in step 111, if it is determined that the next frame photographing timing has elapsed (Yes in step 111), it is determined whether the release button is being continuously depressed in the following step 112.

In the determination in step 112, if it is determined that the release button is being continuously depressed (Yes in step 112), the process returns to step 101. As a result, while the release button is being continuously depressed, the processes from step 101 to step 112 are repeated and the continuous photographing is performed.

On the other hand, in the determination in step 112, if it is determined that the release button is not being continuously depressed (No in step 112), this conventional still-image photographing processing ends and the process returns.

As described above, the aperture driving needs to be quickly performed in the still-image photography. In this case, the aperture driving of plural steps is performed within several milliseconds to several tens of milliseconds. The aperture driving at the time of the still-image photography is different from that at the time of recording the moving images such that the exposure is being continuously kept at an appropriate level while slowly moving the aperture as in the aperture driving at the time of recording the moving image. Further, it is difficult to stabilize and appropriately maintain the exposure when the light amount of the aperture changes greatly during one frame. Therefore, when a difference is present between an aperture value for the still-image photography and that for the live-view display, the exposure during the aperture driving becomes unstable.

Here, as one example of the above, in step 102 before the exposure of the still image, the example will be described with reference to (A) of FIG. 10 in the case in which the aperture position at the time of the live-view display is greater in the Av than the aperture position at the time of the still-image photography (the amount of light that passes through the aperture 202 is small).

FIG. 10 illustrate in time sequence display examples of the EVF 301 or the rear liquid crystal monitor 106 during the still-image photographing processing from the upper side to the lower side illustrated in FIG. 10, and (A) of FIG. 10 illustrates in time sequence the display examples during the conventional still-image photographing processing illustrated in FIG. 3. In (A) of FIG. 10, the aperture 202 is driven to the aperture position of the live-view display in the direction in which the Av becomes greater after the exposure of the still image. In the descriptions of this example, the driving of the shutter unit 101 before and after the exposure of the still image is not considered and descriptions will be limited to behavior during the aperture driving.

In this example, in step 102, because an operation is performed in which the aperture 202 is opened, the live-view display is temporarily displayed brightly as illustrated in the display examples of 'aperture driving, live view Av->still image Av' of (A) of FIG. 10. During the exposure of the still image in step 106, the live-view display is blacked out as illustrated in the display examples of 'still-image exposure' of (A) of FIG. 10. Further, after the exposure of the still image, the electronic shutter speed and the imaging sensitivity in which the imaging becomes proper in the aperture position of the live-view display are set. In this case, because it becomes overexposed at the aperture value at the time of the still-image photography, a bright image is displayed immediately after completion of the still-image exposure as illustrated in the display examples of 'aperture driving, still image Av->live view Av' of (A) of FIG. 10. This display example indicates that a proper exposure is approximated for the whole image from blown out highlights along with the aperture driving. While steps 110 and 111 (the LV photometry and the exposure updating of the live-view display) are repeated after the completion of the aperture driving, the exposure of the live-view display becomes stable as in the display examples of the 'live-view display after the aperture driving' of (A) of FIG. 10. When the aperture driving is performed normally during the live-view display, as the aperture driving is performed for a shorter time as in a photography time lag, more benefits are not acquired. Therefore, the aperture driving can be performed slowly without quickly performing the aperture driving, and the aperture driving can be controlled so that the exposure becomes stable.

When the parallel processes in steps 102, 103 and 104 of FIG. 3 are performed with respect to the next frame photography of the continuous photographing, the aperture 202 is driven from the aperture position at the time of the live-view display to the aperture position at the time of the still-image photography. As a result, the aperture 202 is opened and the light amount is quickly increased, and thereby the live-view display becomes an overexposure display. When the preparation operation of the shutter unit 101 is included in the above, the brightness of the live-view display may be darkened. Depending on the driving direction and timing of the shutter unit 101 and the aperture 202, the behavior is considered in which the live-view display becomes bright once and then dark during the aperture driving. In such a state, it is difficult to stabilize the exposure with the use of control of the electronic shutter speed and the imaging sensitivity. In view of appearance, particularly, the problem arises that the live-view display becomes a mixture of bright and dark. There is the possibility that the blown out highlights or overexposure display may cause the user to experience glare and unsightly images are presented to the user such that a light source that shines periodically is viewed.

As described above, the problem arises that when the live-view display is performed during a period in which the exposure becomes unstable, the live-view display has a bad appearance. As measures to deal with the above problem, conventionally, measures are performed wherein the live-view display is blacked out and is not performed in the period in which the exposure becomes unstable.

Figure 4:
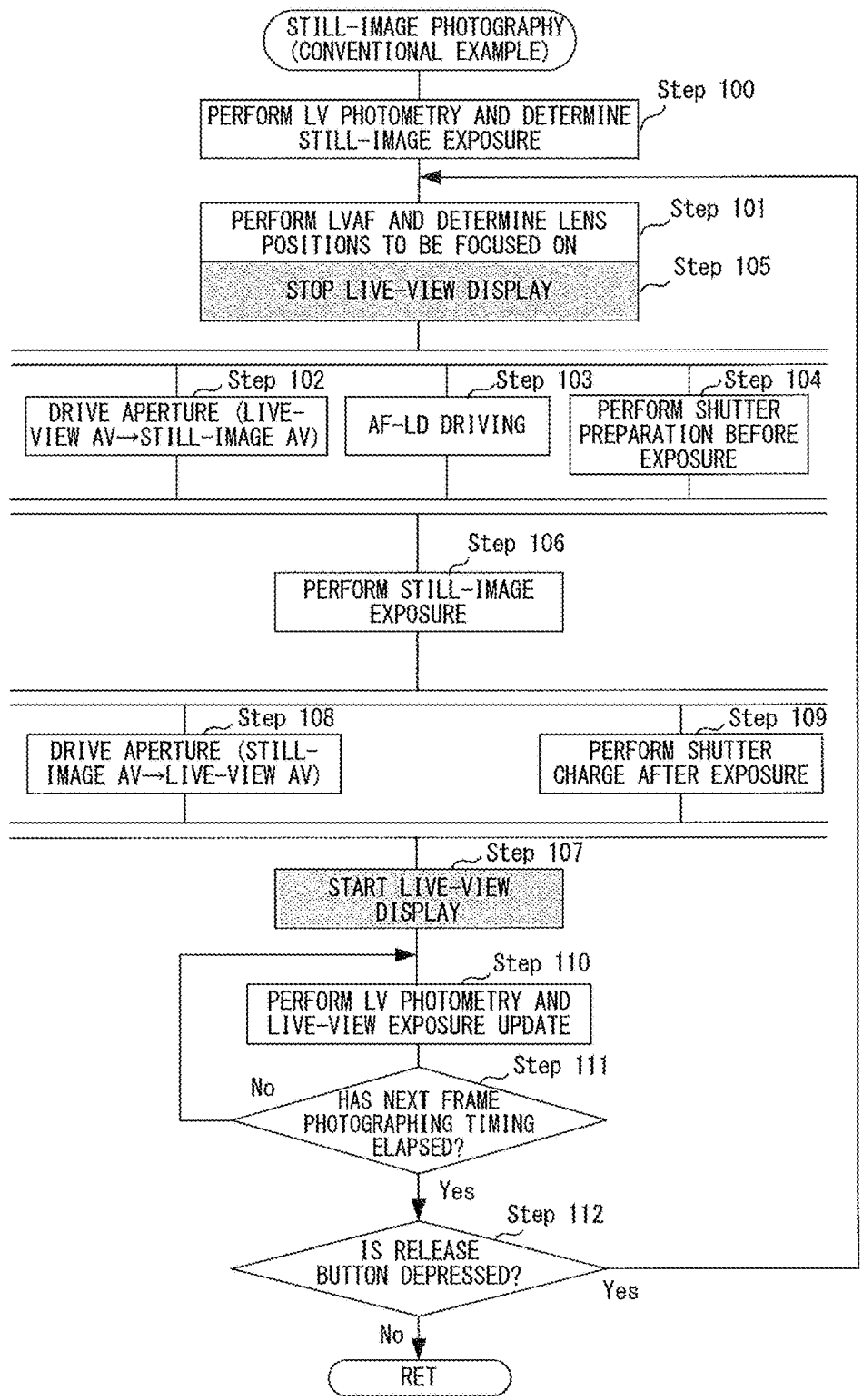
FIG. 4 is a flowchart illustrating one example of the conventional still-image photographing processing.

FIG. 4 is a flowchart illustrating one example of the conventional still-image photographing processing in which such countermeasures are performed.

The conventional still-image photographing processing illustrated in FIG. 4 is different from that illustrated in FIG. 3 in the timing of stopping and starting of the live-view display.

More specifically, in the conventional still-image photographing processing illustrated in FIG. 3, the live-view display stopping (step 105) is performed immediately before the still-image exposure (step 106). In contrast, in the conventional still-image photographing processing illustrated in FIG. 4, the live-view display stopping (step 105) is performed after the LVAF and the focus position determination (step 101) and is performed before the aperture driving (step 102), the AF and LD driving (step 103), and the shutter preparation before exposure (step 104).

Further, in the conventional still-image photographing processing illustrated in FIG. 3, the live-view display starting (step 107) is performed immediately after the still-image exposure (step 106). In contrast, in the conventional still-image photographing processing illustrated in FIG. 4, the live-view display starting (step 107) is performed after the aperture driving (step 108) and the shutter charge after exposure (step 109) and is performed before the LV photometry and live view exposure update (step 110).

The conventional still-image photographing processing illustrated in FIG. 4 is the same as that illustrated in FIG. 3 in the other points.

The display of the period in which the exposure becomes unstable is blacked out by this conventional still-image photographing processing illustrated in FIG. 4 as described above, thereby avoiding a situation in which blinking is repeated and an appearance is bad. However, on the other hand, the image disappearance time is increased and it is difficult for the user to track the subject during the continuous photographing.

One example of the above is illustrated in (B) of FIG. 10. (B) of FIG. 10 illustrates in time sequence the display examples in the conventional still-image photographing processing illustrated in FIG. 4.

As illustrated in (B) of FIG. 10, the blackout period before and after the still-image exposure is lengthened in accordance with the conventional still-image photographing processing illustrated in FIG. 4. Therefore, the period in which the exposure becomes unstable is eliminated but an image display period is shortened along with the above. Therefore, there is the problem that it is difficult for the user to track the subject during the continuous photographing.

With respect to the conventional still-image photographing processing illustrated in FIGS. 3 and 4 as described above, in the still-image photographing processing according to the present embodiment, the timing of stopping and starting of the live-view display is changed before and after the exposure of the still image in accordance with whether predetermined conditions is satisfied. Thereby, the following process is performed so as to satisfy both reduction in the image disappearance time and prevention of deterioration of the appearance during the period in which the exposure becomes unstable.

Figure 5:
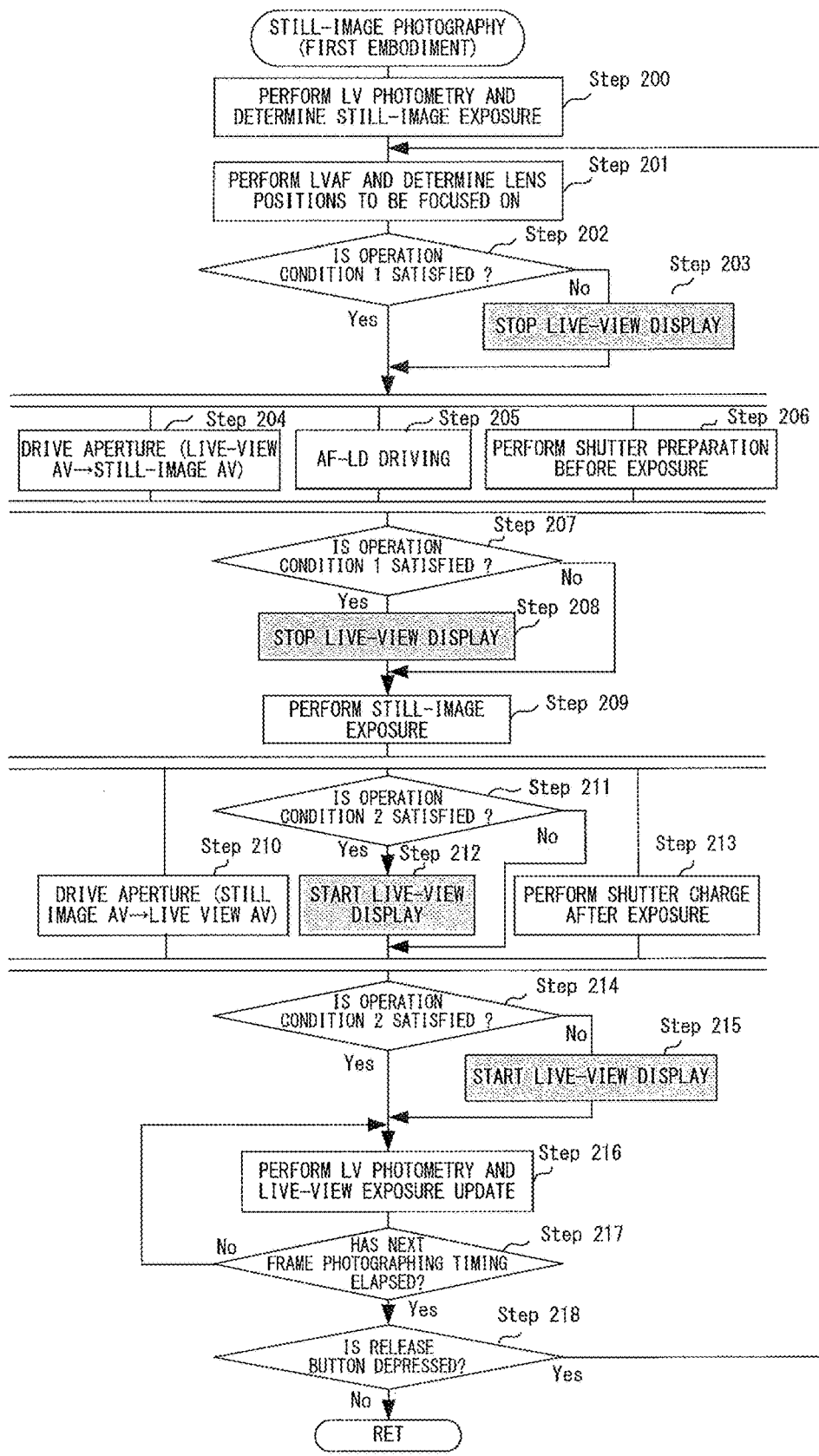
FIG. 5 is a flowchart illustrating one example of a still-image photographing processing of the camera according to the first embodiment.

FIG. 5 is a flowchart illustrating one example of the still-image photographing processing (step 60 of FIG. 2) according to the present embodiment.

If the release button is depressed in step 50 of FIG. 2 (Yes in step 50 of FIG. 2), as illustrated in FIG. 5, in step 200, photometry of the subject is first performed and exposure conditions at the time of the still-image photography are determined on the basis of the acquired photometric value in the same manner as in step 100 of FIG. 3. Examples of the exposure conditions include an Av, the shutter speed, and the imaging sensitivity at the time of the still-image photography.

In the following step 201, in the same manner as in step 101 of FIG. 3, the LVAF is performed and a position of lenses (positions of the photographing lenses 201) to be focused on the subject is detected (determined).

In the following step 202, it is determined whether operation condition 1 is satisfied. When the live-view display is performed during the following processes in steps 204, 205, and 206, operation condition 1 is a condition relating to whether the live-view display is visually undesirable. More specifically, operation condition 1 is an operation condition in which, in the aperture values (Avs), the Av at the time of the live-view display and the Av at the time of the still-image photography are compared with each other and both are equal to each other or the latter is greater than the former. When expressed using a mathematical formula, operation condition 1 is expressed as the next formula (1).

Av at the time of the live-view display<=Av at the time of the still-image photography Formula (1)

In the determination in step 202, if it is determined that operation condition 1 is not satisfied (No in step 202), the live-view display is stopped in the following step 203 and the process proceeds to the parallel processes in steps 204, 205, and 206.

On the other hand, in the determination in step 202, if it is determined that operation condition 1 is satisfied (Yes in step 202), the process skips step 203 and proceeds to the parallel processes in steps 204, 205, and 206. In this case, the live-view display is performed as it is.

In the parallel processes in steps 204, 205, and 206, the same processing as that of the parallel processes insteps 102, 103, and 104 of FIG. 3 is performed. Specifically, in step 204, the aperture is driven from the aperture position at the time of the live-view display to the aperture position at the time of the still-image photography. In step 205, the photographing lenses 201 are driven to the lens position determined in step 201. In step 204, the shutter preparation processing before the exposure is performed. Note that it is preferable that in step 206, a slight waiting time be set before closing the front curtain of the shutter unit 101 to thereby delay a time at which the front curtain is closed and the shutter preparation processing in step 206 be completed in the vicinity of the timing at which the aperture driving in step 204 and the lens driving in step 205 have been finished. For example, it is preferable that when 20 milliseconds is required for the aperture driving in step 204 and 10 milliseconds is required for the time at which the front curtain of the shutter unit 101 is closed in step 206, the shutter preparation driving be started after the waiting time of 10 milliseconds in step 206.

After the parallel processes in steps 204, 205, and 206 are performed, it is determined whether operation condition 1 is satisfied in the following step 207, in the same manner as in step 202.

In the determination in step 207, if it is determined that operation condition 1 is satisfied (Yes in step 207), the live-view display is stopped in the following step 208 and the process proceeds to step 209.

On the other hand, in the determination in step 207, if it is determined that operation condition 1 is not satisfied (No in step 207), the process skips step 208 and proceeds to step 209.

In step 209, the still-image exposure is performed in the same manner as in step 106 of FIG. 3.

The following step 210, steps 211 and 212, and step 213 are performed in parallel.

In step 210, the aperture 202 is driven from the aperture position at the time of the still-image photography to the aperture position at the time of the live-view display in the same manner as in step 108 of FIG. 3.

In step 211, it is determined whether operation condition 2 is satisfied. When the live-view display is performed during the processes in steps 210 and 213, operation condition 2 is an operation condition relating to whether the live-view display is visually undesirable. In the present embodiment, operation condition 2 is set to be the same as operation condition 1; however, both of operation conditions 1 and 2 may be different operation conditions.

In the determination in step 211, if it is determined that operation condition 2 is satisfied (Yes in step 211), the live-view display is started in the following step 212.

On the other hand, in the determination in step 211, if it is determined that operation condition 2 is not satisfied (No in step 211), the process skips step 212.

In step 213, in the same manner as in step 109 of FIG. 3, an operation is performed in which the shutter unit 101 driven for the still-image exposure is returned to a state before the exposure and the shutter unit 101 is put into a fully open state for a restarting of the live-view display.

After the parallel processes in step 210, steps 211 and 212, and step 213 are performed, it is determined whether operation condition 2 is satisfied in the following step 214 in the same manner as in step 211.

In the determination in step 214, if it is determined that operation condition 2 is not satisfied (No in step 214), the live-view display is started in the following step 215 and the process proceeds to step 216.

On the other hand, in the determination in step 214, if it is determined that operation condition 2 is satisfied (Yes in step 214), the process skips step 215 and proceeds to step 216.

In step 216, in the same manner as in step 110 of FIG. 3, the LV photometry is performed and update control of the exposure is performed so that the exposure of the live-view display coincides with the target exposure on the basis of the acquired photometric value.

In the following step 217, in the same manner as in step 111 of FIG. 3, in the case of the continuous photographing, it is determined whether the next frame photographing timing has elapsed, in order to perform the continuous photographing at the set continuous photographing speed.

In the determination in step 217, if it is determined that the next frame photographing timing has not elapsed (No in step 217), the process returns to step 216.

On the other hand, in the determination in step 217, if it is determined that the next frame photographing timing has elapsed (Yes in step 217), it is determined whether the release button is being continuously depressed, in the same manner in the following step 218 as in step 112 of FIG. 3.

In the determination in step 218, if it is determined that the release button is being continuously depressed (Yes in step 218), the process returns to step 201. As a result, while the release button is being continuously depressed, the processes from step 201 to step 218 are repeated and the continuous photographing is performed.

On the other hand, in the determination in step 218, if it is determined that the release button is not being continuously depressed (No in step 218), the still-image photographing processing according to the present embodiment ends and the process returns Here, the operation conditions that are determination conditions in steps 202, 207, 211, and 214 illustrated in FIG. 5 will be described in more detail with reference to FIGS. 6 and 7.

Figure 6:
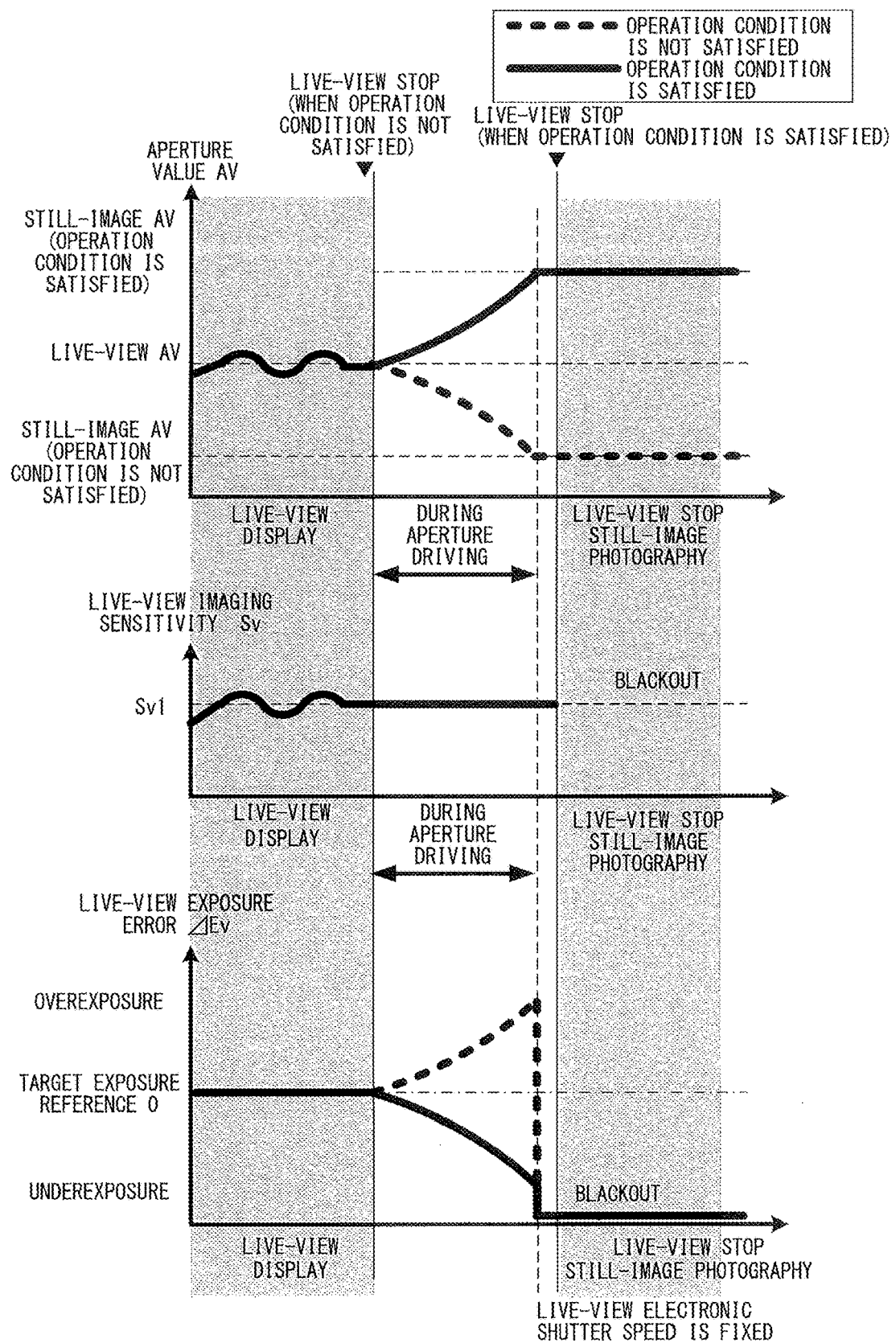
FIG. 6 illustrates operation condition 1 for determining live-view display stop timing before a still-image exposure and one example of an exposure in a live-view display.

FIG. 6 illustrates operation condition 1 for determining a live-view display stop timing before the exposure of the still image (before step 209 of FIG. 5) and one example of the exposure of the live-view display. FIG. 7 illustrates operation condition 2 for determining the live-view display stop timing after the exposure of the still image (after step 209 of FIG. 5) and one example of the exposure of the live-view display. In the present embodiment, operation conditions 1 and 2 are expressed using the above formula (1) (Av at the time of the live-view display<=Av at the time of the still-image photography).

Figure 7:
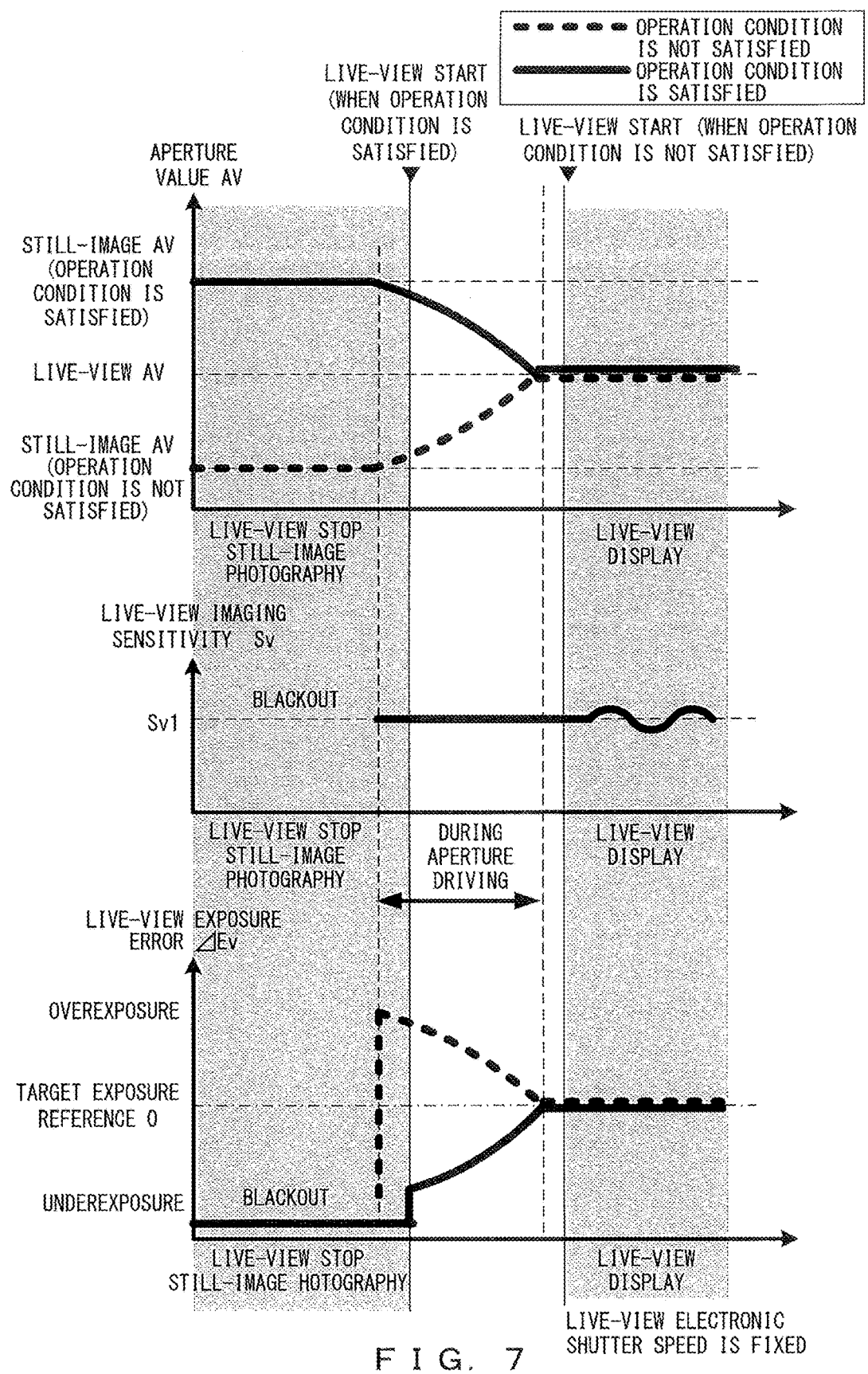
FIG. 7 illustrates operation condition 2 for determining the live-view display stop timing after the still-image exposure and one example of the exposure in the live-view display.

In each figure of FIGS. 6 and 7, three graphs are illustrated on the upper side, in the center, and on the lower side thereof. A longitudinal axis of the graph on the upper side represents the aperture value (Av). A longitudinal axis of the graph in the center represents the imaging sensitivity (Sv (Sensitivity Value)) during the live-view display. A longitudinal axis of the graph on the lower side represents an error (ΔEv (Exposure Value)) from the target exposure in the live-view display, and the overexposure is set as a plus and the underexposure is set as a minus with respect to the target exposure. Further, a horizontal axis of each graph illustrated in FIG. 6 represents a flow of a still-image photographic sequence from the live-view display to the blacking out of the still-image photography (still-image exposure). A horizontal axis of each graph illustrated in FIG. 7 represents a flow of the still-image photographic sequence from the blacking out of the still-image photography (still-image exposure) to the live-view display. Further, in each graph of FIG. 6, a thick solid line shows a state when operation condition 1 is satisfied and a thick broken line shows a state when operation condition 1 is not satisfied. In each graph of FIG. 7, a thick solid line shows a state when operation condition 2 is satisfied and a thick broken line shows a state when operation condition 2 is not satisfied. Further, in a period during the live-view display indicated on the left side of each graph illustrated in FIG. 6 and on the right side of each graph illustrated in FIG. 7, the Av and the imaging sensitivity Sv are controlled so that the exposure of the live-view display coincides with the target exposure in accordance with the subject luminance (see step 40 of FIG. 2 and step 216 of FIG. 5). Here, the electronic shutter speed Tv (Time Value) is set to be fixed for ease of explanation. Further, in actual camera control, the Tv may be changed to adjust the exposure in place of the Sv, or the Sv and the Tv may be changed at the same time.

In FIG. 6, a case will first be described in which operation condition 1 is not satisfied.

In the graph on the upper side, when operation condition 1 is not satisfied, the Av at the time of the still-image photography is changed to an Av smaller than the Av at the time of the live-view display, and the changed Av is shown using the thick broken line. In the graph in the center, an example is shown in which the imaging sensitivity at the time of stopping the live-view display is still fixed. At this time, the exposure error of the live-view display in the case in which the live-view display is supposed to be performed is shown using the thick broken line in the graph on the lower side. In this case, the light amount to the image pickup device 102 is increased by driving the aperture 202 to the open side, and therefore it becomes overexposed in the live-view display. Then, the aperture 202 reaches the Av at the time of the still-image photography to perform the still-image photography (still-image exposure), and therefore the live-view display is blacked out. Here, because operation condition 1 is not satisfied, the live-view display stop timing is before the aperture driving (before step 204). Further, on the upper side of the graph on the upper side, the live-view display stop timing is shown in two portions. When operation condition 1 is not satisfied, the live-view display stop timing on the left side is shown. Therefore, the live-view display is blacked out during the aperture driving. In the present embodiment, in order to clarify whether the live-view display is performed, the live-view display is blacked out as described above. In the actual control, the live-view display is not blacked out, but an indication of a final frame in the live-view display may be fixed.

In FIG. 6, a case will be described next in which operation condition 1 is satisfied.

When operation condition 1 is satisfied, the live-view display is performed during the aperture driving. Because the Av is increased from the Av at the time of the live-view display, an image in which the live-view display is performed is changed in the direction of underexposure. In this case, because the live-view display is blacked out after the completion of the aperture driving, even if the live-view display is performed during the aperture driving, a sequence of the movements in which the exposure of the live-view display is from proper exposure to underexposure and the live-view display is finally blacked out is under control such that a sense of discomfort due to the appearance is eliminated and that is capable of minimally suppressing an image disappearance time before the exposure of the still image. Further, a direction of the shutter preparation driving before the still-image exposure is also the direction in which the shutter unit 101 is driven to a closed state and therefore is in the direction of underexposure. Also, in consideration of operations of the shutter unit 101, the direction of the shutter preparation driving is not different from the variation in the brightness in one direction. The above is illustrated in FIG. 8.

Figure 8:
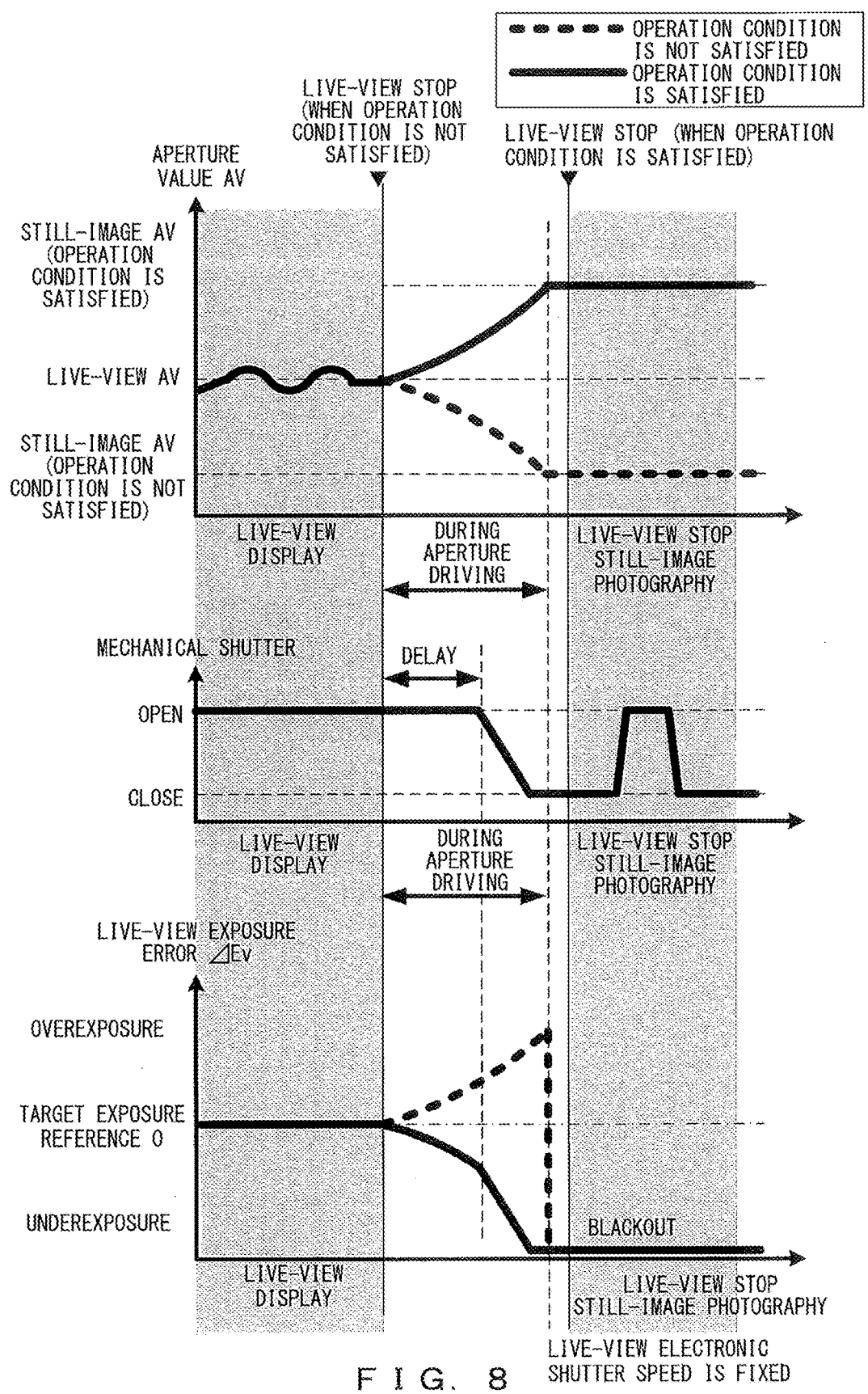
FIG. 8 is obtained by replacing a graph in the center illustrated in FIG. 6 with a graph showing one example of an operation (an open and close operation of a mechanical shutter) of a shutter unit.

FIG. 8 is obtained by replacing the graph in the center illustrated in FIG. 6 with a graph showing one example of operations (an open and close operation of a mechanical shutter) of the shutter unit 101. As illustrated in FIG. 8, depending on a timing at which the mechanical shutter is closed, generally only the blackout start timing is accelerated.

Next, FIG. 7 will be described.

In FIG. 7, as shown in the graph in the center, in the imaging sensitivity Sv, the imaging sensitivity Sv1 (see the graph in the center illustrated in FIG. 6) is finally used in the live-view display before the still-image exposure is set as the imaging sensitivity Sv at the time of starting the live-view display.

In FIG. 7, when operation condition 2 is not satisfied, the aperture 202 is driven in the direction in which the aperture 202 is closed. However, the aperture 202 is not yet closed after the completion of the blacking out of the still-image exposure, and therefore when the live-view display is performed here, it becomes overexposed. To deal with the above, when operation condition 2 is not satisfied, the live-view display is started after the completion of the aperture driving.

In FIG. 7, when operation condition 2 is satisfied, the live-view display is performed at the same time before the aperture driving. Here, in the present embodiment, the image pickup device 102 (and the image pickup device drive IC 103) outputs an imaging signal to the image processing IC 104 after the exposure of the still image. At this time, a time is also considered at which the imaging mode of the image pickup device 102 is switched into a state of the live-view display after an output of the imaging signal, and therefore the live-view display is started slightly behind a starting of the aperture driving. As the aperture driving direction at the time when operation condition 2 is satisfied, the live-view display is driven in the direction of proper exposure, and therefore the live-view display is performed from the blackout to the target exposure through an underexposed image. In view of the appearance, a sense of discomfort is eliminated in a sequence of displays at this time. Further, because the shutter unit 101 after the exposure of the still image is driven in the direction of an open state, the live-view display becomes bright and the exposure of the live-view display coincides with the target exposure at the time of the fully open state. Also, in consideration of the above-described operations of the shutter unit 101, the direction of the shutter preparation driving is not different from the variation in the brightness in one direction. The above is illustrated in FIG. 9.

Figure 9:
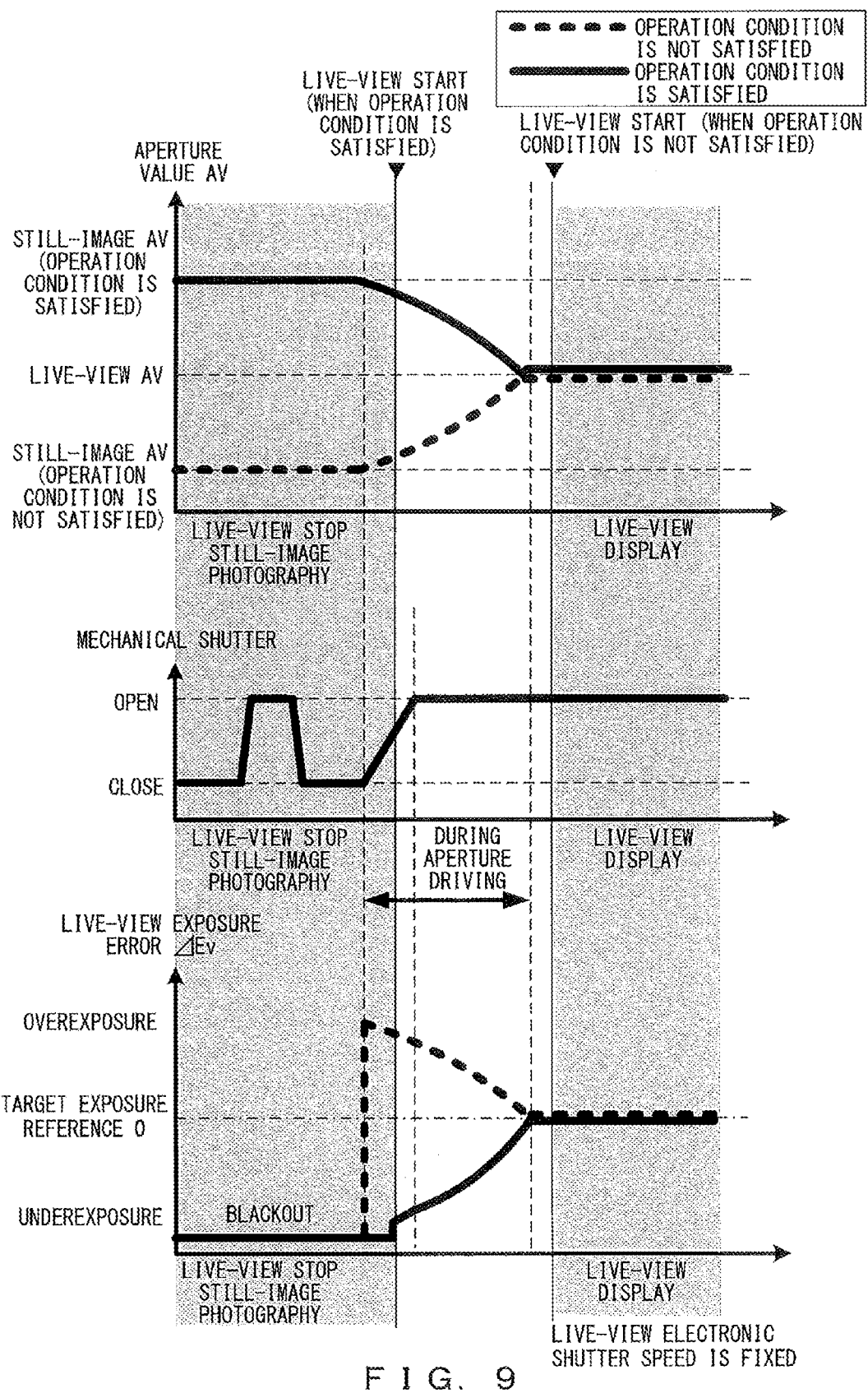
FIG. 9 is obtained by replacing a graph in the center illustrated in FIG. 7 with the graph showing one example of the operation (the open and close operation of the mechanical shutter) of the shutter unit.

FIG. 9 is obtained by replacing the graph in the center illustrated in FIG. 7 with a graph showing one example of operations (open and close operation of the mechanical shutter) of the shutter unit 101. As illustrated in FIG. 9, generally only the speed from the blackout to the proper exposure is partially delayed.

The display examples are illustrated in (C) of FIG. 10 in the case in which operation conditions 1 and 2 are satisfied. (C) of FIG. 10 illustrates in time sequence the display examples during the still-image photographing processing according to the present embodiment illustrated in FIG. 5. As illustrated in (C) of FIG. 10, a change in direction of the brightness in the display from the blacking out of the still-image photography (still-image exposure) to the live-view display of the proper exposure can be seen in one direction. In addition, another change in direction of the brightness in the display from the live-view display of the proper exposure to the blacking out of the still-image photography (still-image exposure) can be seen in another direction. As described above, when a change in the brightness from the blackout to the proper exposure or that from the proper exposure to the blackout is performed during the continuous photographing, a connection of the change in the brightness during the continuous photographing becomes natural and the appearance is preferable. On the other hand, when operation conditions 1 and 2 are not satisfied, the display examples are illustrated in (B) of FIG. 10.

Heretofore, the control of the aperture 202 has been described using simple examples. Also in the actual camera control, an advantageous effect of the control according to the present embodiment is largely exerted as a matter of course. For example, the above is apparent for the following reasons.

In AF that is performed during the live-view display, a focus position is desirably detected in a state in which the depth of the field is shallow. Therefore, in the case of the Av at the time of the still-image photography>=the Av at the time of the live-view display (specifically, when the above formula (1) is satisfied), the above inequality is reasonable in view of a response such as a continuous photographing speed or the like.

Further, an optimum aperture state of the AF is a full-open state of the aperture. Specifically, the above state is a state in which the Av is minimized. This state coincides with those of operation conditions 1 and 2 for determining a timing of stopping and starting of the live-view display according to the present embodiment.

Accordingly, in a general photographing scene, an image disappearance time in the live-view display can be shortened or the live-view display can be resumed at an early stage after the still-image photography.

On the other hand, in the case of the Av at the time of the still-image photography<the Av at the time of the live-view display (specifically, when the above formula (1) is not satisfied), the aperture 202 needs to be opened to the open side once in order to perform the LVAF. As described above, a case in which the above formula (1) is not satisfied results due to a difference between the electronic shutter speed and imaging sensitivity selectable in the live-view display and the electronic shutter speed and imaging sensitivity selectable in the still-image photography under a special light source. In this case, the same control as the conventional control (the still-image photographing processing illustrated in FIG. 4) is controlled. Further, the image pickup device 102 progresses day by day and an imaging sensitivity setting range and electronic shutter speed setting range in the live-view display are widened, and therefore such conditions are considered to be reduced in the future. Accordingly, photographing situations capable of shortening the image disappearance time through the control (the still-image photographing processing illustrated in FIG. 5) according to the present embodiment are apparently increased more and more in the future.

Further, the camera according to the present embodiment can be modified as follows.

As modification 1, for example, regardless of conditions relating to the aperture value (Av), the conditions relating to a lens driving amount (lens driving amount in the case of driving the photographing lenses 201 to a lens position determined in step 201) in step 205 of FIG. 5 may be added to each of operation conditions 1 and 2. In this case, each of the operation conditions are, for example, conditions in which the lens driving amount is smaller than or equal to a predetermined amount and the above formula (1) is satisfied. Accordingly, if the lens driving amount is greater than the predetermined amount (namely, if each of the operation conditions is not satisfied), each determination in steps 202 and 207 is No, for example, before the exposure of the still image and the live-view display is stopped before the parallel processes in steps 204, 205 and 206 are performed. In the present modification, a movement amount of an image plane to a focus position may be used in place of the lens driving amount, and in this case, a determination can be performed in which a relevance is higher in the appearance of the live-view display.

Figure 11:
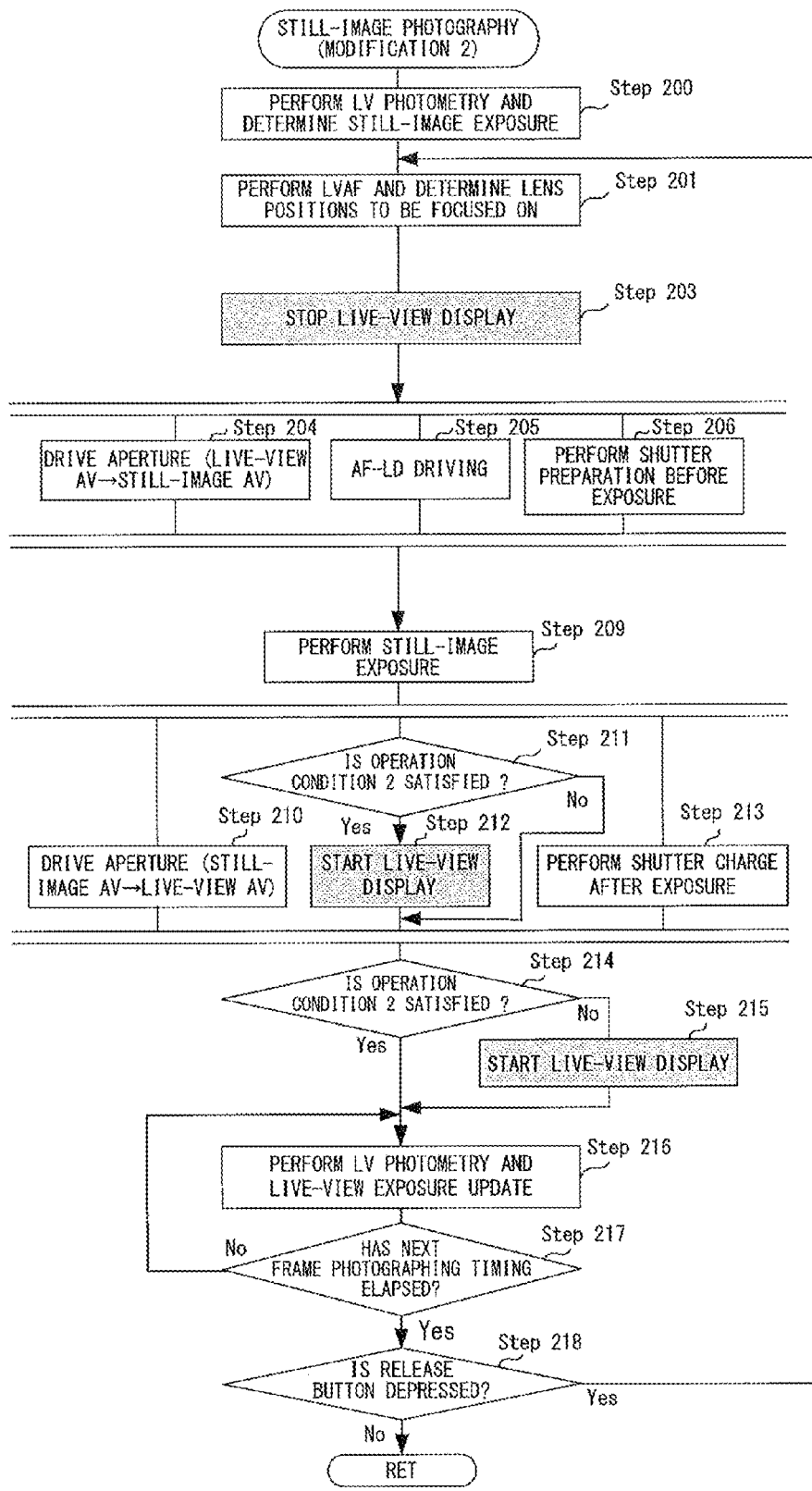
FIG. 11 is a flowchart illustrating one example of the still-image photographing processing of a camera according to modification 2 of the first embodiment.

As illustrated in FIG. 5, in the present embodiment, timing control of the live-view display is performed in accordance with a case in which the operation condition is satisfied or a case in which the operation condition is not satisfied in each of before the still-image exposure and after the still-image exposure. However, as modification 2, for example, such timing control may be performed only in either of before the still-image exposure and after the still-image exposure. FIG. 11 is a flowchart illustrating one example of the still-image photographing processing according to the above modification 2. In the example illustrated in FIG. 11, only after the still-image exposure, the timing control of the live-view display is performed in accordance with the case in which the operation condition is satisfied or the case in which the operation condition is not satisfied. In this case, after the still-image exposure, an advantageous effect can be acquired of accelerating a start timing of the live-view display. In the example illustrated in FIG. 11, before the still-image exposure, after the process in step 201 is performed and also before the parallel processes in steps 204, 205, and 206 are performed, the process so as to stop the live-view display is performed.

Further, in the still-image photographing processing according to the present embodiment, a variation in the brightness due to the aperture driving occurs in one direction during the live-view display, and thereby the electronic shutter speed and imaging sensitivity of the image pickup device 102 are kept fixed during a period of the aperture driving as illustrated in FIGS. 6 and 7 etc. However, as modification 3, for example, one or both of the electronic shutter speed and imaging sensitivity of the image pickup device 102 may be changed so as to cancel the variation in the brightness due to the aperture driving during the live-view display. Further, the aperture driving is at a high speed before and after the still-image photography (exposure) to be supposed in the present embodiment, and therefore the aperture may fail to respond to a stable exposure; however, a reduction in the exposure variation can be targeted.

Figure 12:
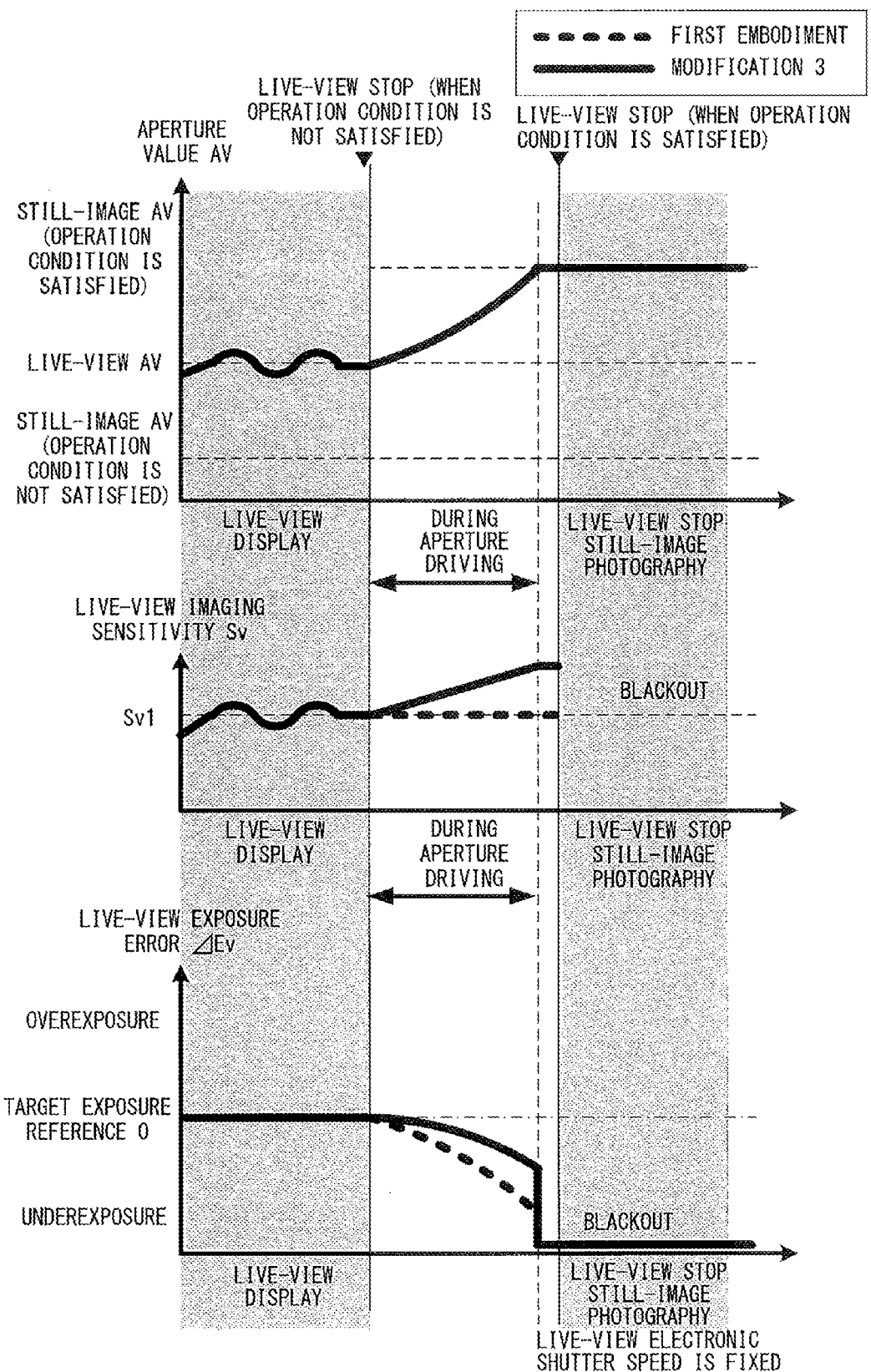
FIG. 12 illustrates a difference between the first embodiment and modification 3 of the first embodiment.
Figure 13:
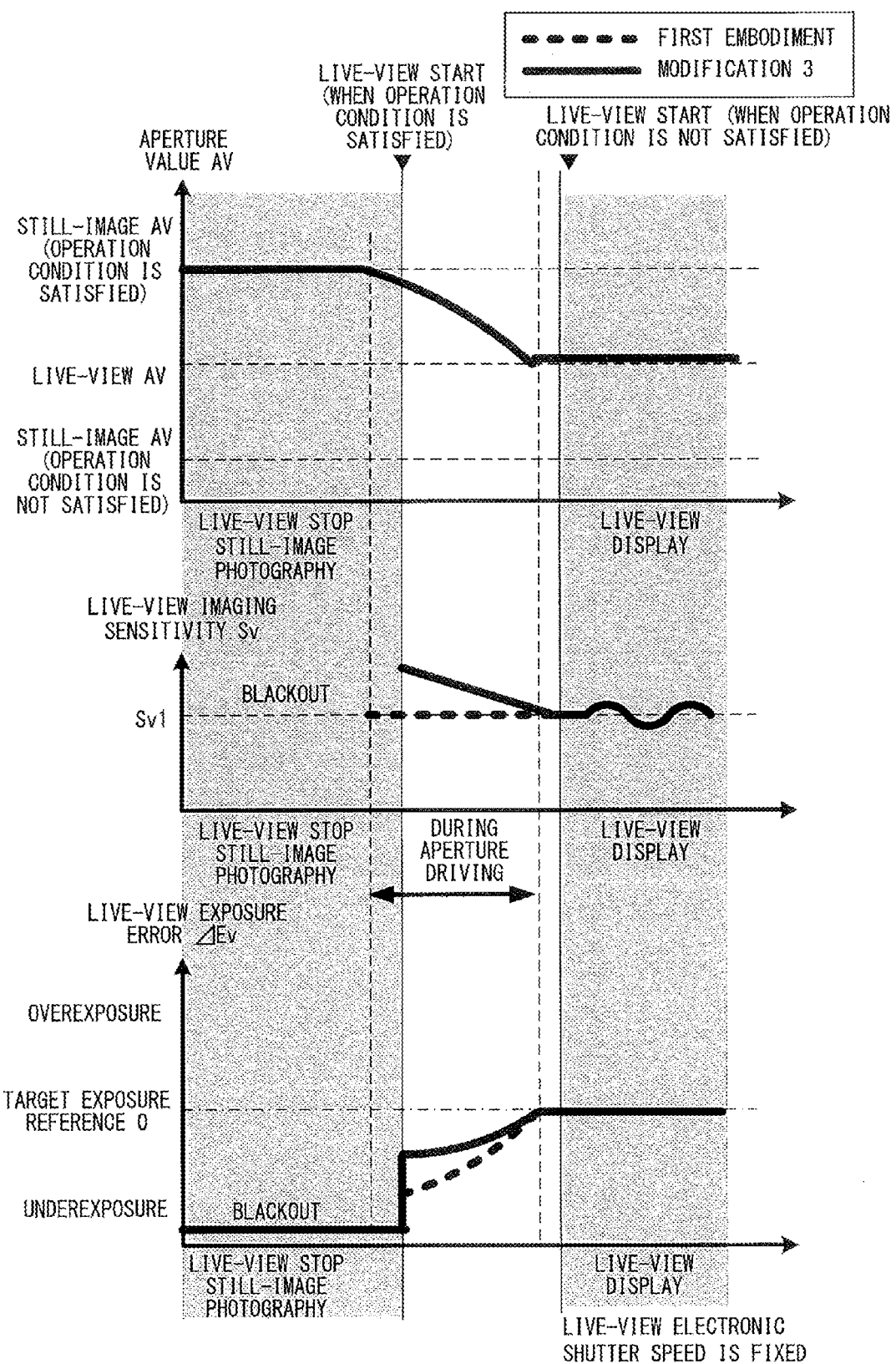
FIG. 13 illustrates a difference between the first embodiment and modification 3 of the first embodiment.

FIGS. 12 and 13 illustrate a difference between the above modification 3 and the first embodiment. Further, FIGS. 12 and 13 correspond to FIGS. 6 and 7. Note that, in FIGS. 12 and 13, modification 3 is shown using a thick solid line, and the first embodiment (note that the operation condition is satisfied) is shown using a thick broken line. As illustrated in FIGS. 12 and 13, in modification 3, during the aperture driving in the live-view display, the imaging sensitivity Sv is changed so as to cancel the variation in the exposure (brightness) due to the aperture driving. In FIG. 12, for example, the imaging sensitivity Sv is increased in the sensitivity so as to cancel the variation in the exposure due to the aperture driving, and thereby the live-view display up to the blackout can be provided using an indication nearer to the target exposure level. Generally, it is not easy to synchronize the aperture driving before and after the still-image photography (exposure) with the imaging sensitivity and the electronic shutter speed. To deal with the above, in order not to display an overexposed image due to an overcorrection (too much change), control is preferably performed in which an increase in sensitivity (or an amount to delay the electronic shutter speed) is kept small and an underexposure amount is reduced as the target.

Further, in the present embodiment, operation conditions 1 and 2 are defined as in the above formula (1). The above formula (1) is a formula in which the overexposed image is not displayed from the live-view display to the blackout and that is also made simpler for convenience of explanation. For example, if there is a very slight overexposure of about ⅙ step, the user is unlikely to notice that an image has become brighter in appearance. Further, when the reduction in the image disappearance time and the appearance in the live-view display are weighed on balance, because a tolerance level of unsightliness varies with individuals, a request is also considered in which tracking of the subject is prioritized and a reduction in the image disappearance time is prioritized. Further, a gamma curve is more flattened when used at the time when an image is generated from the imaging output (output from the image pickup device 102 and the image pickup device drive IC 103) using the image processing IC 104. As a result, a brightness variation in the live-view display can be obscured with respect to a variation in an imaging exposure amount, and therefore the unsightliness can be suppressed. However, when the gamma curve is flattened, an image may have a low contrast and an image in the live-view display may become an image that is not sharp, and therefore the gamma curve is subject to limitations in flattening. In consideration of the above, it is ideal there be no overexposure during the continuous photographing; however, in exchange for the unsightliness, it is considered that the overexposed image is displayed and thereby the reduction in the image disappearance time is prioritized. To deal with the above, as modification 4, the above formula (1) (operation conditions 1 and 2) may be changed into the following formula (2) which is an operation condition formula in consideration of the overexposure amount within the tolerance level in the live-view display.

The Av at the time of the live-view display<=Av at the time of the still-image photography+offset value   Formula (2)

In the above formula (2), the offset value is a value based on the gamma curve used for the live-view display and is, for example, stored in advance in a nonvolatile memory (not illustrated) within the Bµcom 110. This offset value may be, for example, set or changed in accordance with operations of the camera operation switch 113 by the user. In this case, for example, on the basis of the operations of the camera operation switch 113, the camera may be configured so as to select either 'live-view display quality priority' or 'image disappearance time reduction priority' and the offset value used in formula (2) may be set in accordance with either selection. Further, in this case, the offset value corresponding to the 'image disappearance time reduction priority' is greater than that corresponding to the 'live-view display quality priority'. Further, in the case in which the continuous photographing mode and a single photographing mode can be set using operations of a mode change switch etc. of the camera operation switch 113, when set to the single photographing mode, processing may be performed in which operation conditions 1 and 2 are not determined. Specifically, in the case of the continuous photographing mode, the still-image photographing processing illustrated in FIG. 5 is performed and in the case of the single photographing mode, the still-image photographing processing illustrated in FIG. 4 may be performed in place of the still-image photographing processing illustrated in FIG. 5. The reason is that in the single photographing, the live view image having a high appearance quality is preferably displayed as compared to the fact that the subject is easy to track in the continuous photographing.

<Second Embodiment>

A camera according to a second embodiment of the present invention partially differs from the camera according to the first embodiment in the configuration and the operations. In the descriptions of the second embodiment, descriptions will be given with a focus on different points and the same components as those described in the first embodiment will be described using the same reference numerals.

In the camera according to the second embodiment, a quality determination in the live-view display is performed and timing of stopping and starting of the live-view display is controlled on the basis of determination results.

Figure 14:
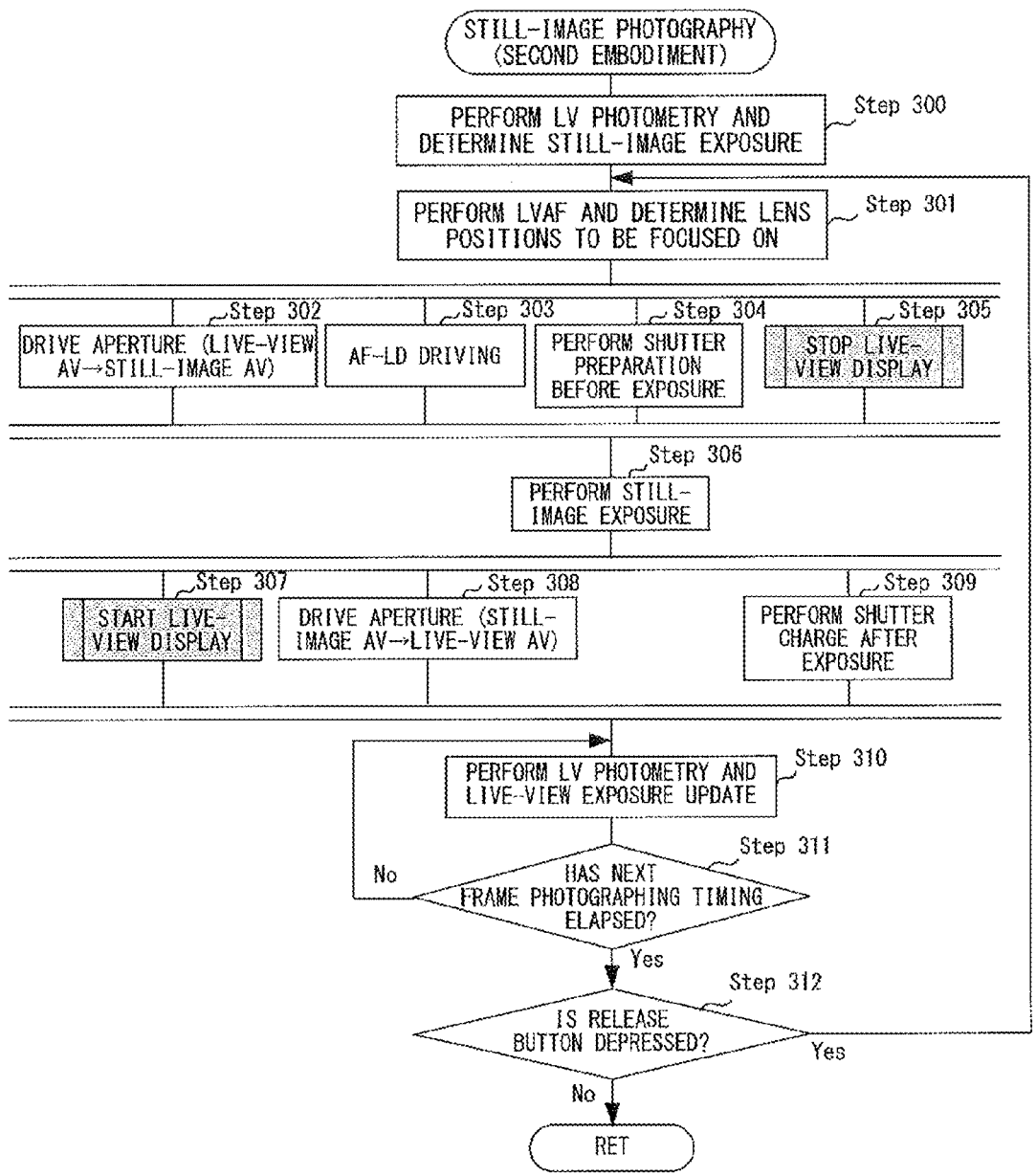
FIG. 14 is a flowchart illustrating one example of the still-image photographing processing of a camera according to a second embodiment.

FIG. 14 is a flowchart illustrating one example of the still-image photographing processing (step 60) according to the second embodiment. Further, basic operations of the camera according to the second embodiment are the same as those of the camera according to the first embodiment illustrated in FIG. 2. Accordingly, the still-image photographing processing illustrated in FIG. 14 starts when the release button is depressed in step 50 of FIG. 2 (Yes in step 50 of FIG. 2).

In FIG. 14, in step 300, photometry of the subject is first performed and exposure conditions at the time of the still-image photography are determined on the basis of the acquired photometric value in the same manner as in step 200 of FIG. 5. Examples of the exposure conditions include an Av, the shutter speed and the imaging sensitivity at the time of the still-image photography.

In the following step 301, in the same manner as in step 201 of FIG. 5, the LVAF is performed and lens positions (positions of the photographing lenses 201) to be focused on the subject are detected (determined).

The processes of the following steps 302, 303, 304, and 305 are performed in parallel.

In steps 302, 303, and 304, the same processes as those in steps 204, 205, and 206 of FIG. 5 are performed. Specifically, in step 302, the aperture is driven from the aperture position at the time of the live-view display to the aperture position at the time of the still-image photography. In step 303, the photographing lenses 201 are driven to the lens position determined in step 301. In step 304, the shutter preparation processing before the exposure is performed.

In step 305, live-view display stop processing is performed for controlling the live-view display stop timing before the still-image exposure in accordance with image quality of the live-view display. Further, details in step 305 will be described below with reference to FIG. 15.

After the parallel processes in steps 302, 303, 304, and 305 are performed, the still-image exposure is performed in step 306 in the same manner as in step 209 of FIG. 5.

The processes of the following steps 307, 308, and 309 are performed in parallel.

In step 307, live-view display start processing is performed for controlling the live-view display start timing after the still-image exposure in accordance with the image quality of the live-view display. Further, details in step 307 will be described below with reference to FIG. 16.

In steps 308 and 309, the same processes as those in steps 210 and 213 of FIG. 5 are performed. Specifically, in step 308, the aperture 202 is driven from the aperture position at the time of the still-image photography to the aperture position at the time of the live-view display. In step 309, an operation is performed in which the shutter unit 101 that is driven for the still-image exposure is returned to a state before the exposure and the shutter unit 101 is put into a fully open state for a restart of the live-view display.

After the parallel processes in steps 307, 308, and 309 are performed, in step 310, in the same manner as in step 216 of FIG. 5, the LV photometry is performed and control of the exposure update is performed on the basis of the acquired photometric value so that the exposure of the live-view display coincides with the target exposure (the LV photometry and control of the live view exposure update).

In step 311, in the same manner as in step 217 of FIG. 5, in the case of the continuous photographing, it is determined whether the next frame photographing timing has elapsed, in order to perform the continuous photographing at the set continuous photographing speed.

In the determination in step 311, if it is determined that the next frame photographing timing has not elapsed (No in step 311), the process returns to step 310.

On the other hand, in the determination in step 311, if it is determined that the next frame photographing timing has elapsed (Yes in step 311), it is determined whether the release button is being continuously depressed in the following step 312 in the same manner as in step 218 of FIG. 5.

In the determination in step 312, if it is determined that the release button is being continuously depressed (Yes in step 312), the process returns to step 301. As a result, while the release button is being continuously depressed, the processes from step 301 to step 312 are repeated and the continuous photographing is performed.

On the other hand, in the determination in step 312, if it is determined that the release button is not being continuously depressed (No in step 312), the still-image photographing processing according to the second embodiment ends and the process returns.

FIG. 15 is a flowchart illustrating one example of the live-view display stop processing (step 305).

As illustrated in FIG. 15, in step 400, it is first determined that the processes insteps 302, 303, and 304 (see FIG. 14) have been completed, which are performed in parallel with the live-view display stop processing.

In the determination in step 400, if it is determined that the parallel processes have been completed (Yes in step 400), the process skips steps 401, 402, and 403 and proceeds to step 404.

On the other hand, in the determination in step 400, if it is determined that the parallel processes have not been completed (No in step 400), the image processing IC 104 acquires image data for one frame capable of the live-view display output from the image pickup device 102 and the image pickup device drive IC 103 in the following step 401.

In the following step 402, on the basis of the image data acquired in step 401, the image processing IC 104 and the Bμcom 110 calculate brightness of the image relating to the image data. A method for calculating the brightness may be the same as that of the LV photometry; however, it is desirable to calculate the brightness not by performing photometry of an area corresponding to a predetermined part of the image but by performing photometry of the area corresponding to the whole image. In the case in which an existing photometry method is described as an example, when 'multi-division photometry' or 'average photometry' other than 'spot photometry' is performed and the brightness is calculated, it is preferable that an influence of the movement of the subject be hard to receive and that calculation results become stable.

In the following step 403, it is determined whether the live-view display is OK on the basis of whether the brightness calculated in step 402 is darker than a predetermined brightness (target brightness). 'Live-view display is OK' means that in regard to appearance the image quality is an image quality capable of live-view display.

In the determination in step 403, if it is determined that the live-view display is OK because the calculated brightness is darker than the predetermined brightness (Yes in step 403), the process returns to step 400.

On the other hand, in the determination in step 403, if it is determined that the live-view display is not OK because the calculated brightness is not darker than the predetermined brightness (No in step 403), the process proceeds to step 404.

In step 404, the live-view display is stopped.

Further, the process completes step 404 and the process returns.

In accordance with the above live-view display stop processing, during the parallel processes in steps 302, 303, and 304 of FIG. 14, when the brightness of the image for one frame capable of the live-view display is brighter than or equal to the predetermined brightness, the live-view display is stopped. Specifically, while the frame capable of the live-view display in regard to appearance is being acquired, the live-view display is not stopped. On the other hand, when the parallel processes in steps 302, 303, and 304 of FIG. 14 have been completed, the live-view display is immediately stopped so as to immediately perform the still-image exposure.

FIG. 16 is a flowchart illustrating one example of the live-view display start processing (step 307).

As illustrated in FIG. 16, in step 500, it is first determined whether the processes in steps 308 and 309 (see FIG. 14) have been completed, which are performed in parallel with the live-view display start processing.

In the determination in step 500, if it is determined that the parallel processes have been completed (Yes in step 500), the process skips steps 501, 502, and 503, and proceeds to step 504.

On the other hand, in the determination in step 500, if it is determined that the parallel processes have not been completed (No in step 500), the same processes as those in steps 401 and 402 of FIG. 15 are performed in the following steps 501 and 502. Specifically, in step 501, the image processing IC 104 acquires the image data for one frame capable of the live-view display output from the image pickup device 102 and the image pickup device drive IC 103. In the following step 502, on the basis of the image data acquired in step 501, the image processing IC 104 and the Bµ com 110 calculate the brightness of the image relating to the image data.

In step 503, it is determined whether the live-view display is OK on the basis of whether the brightness calculated in step 502 is darker than the predetermined brightness (target brightness).

In the determination in step 503, if it is determined that the live-view display is not OK because the calculated brightness is not darker than the predetermined brightness (No in step 503), the process returns to step 500.

On the other hand, in the determination in step 503, if it is determined that the live-view display is OK because the calculated brightness is darker than the predetermined brightness (Yes in step 503), the process proceeds to step 504.

In step 504, the live-view display is started.

When step 404 is completed, the process returns.

In accordance with the above live-view display start processing, during the parallel processes in steps 308 and 309 of FIG. 14, when the brightness of the image for one frame capable of the live-view display is darker than the predetermined brightness, the live-view display is started. Specifically, until the frame capable of the live-view display in regard to appearance is acquired, the live-view display is not started. On the other hand, when the parallel processes in steps 308 and 309 of FIG. 14 have been completed, the live-view display is immediately started.

Figure 17:
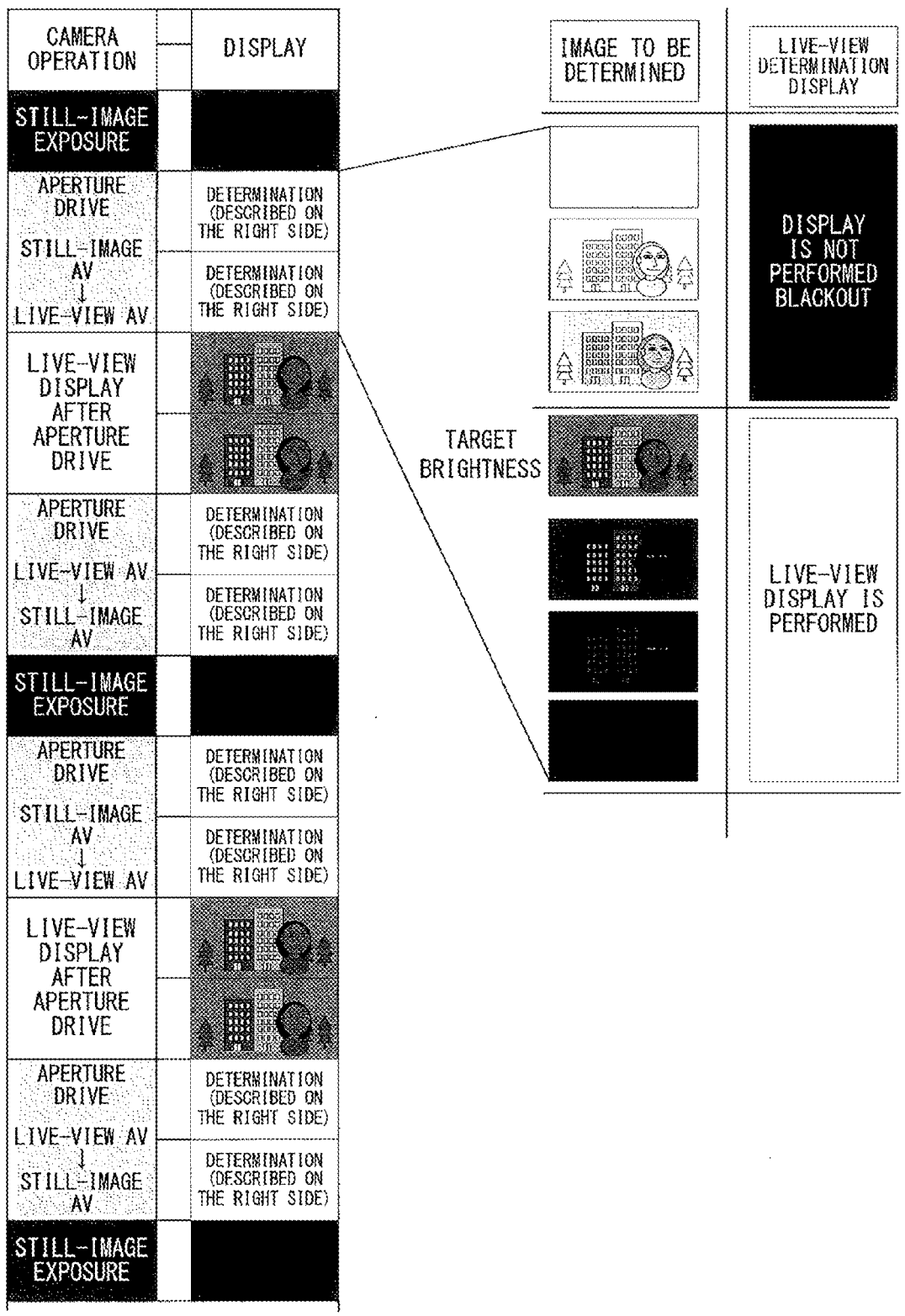
FIG. 17 illustrates, in time sequence, display examples of an EVF or a rear liquid crystal monitor during the still-image photographing processing of the camera according to the second embodiment and illustrates one example of the live-view display based on an image quality determination.

FIG. 17 illustrates the display examples of the EVF 301 or the rear liquid crystal monitor 106 during the still-image photographing processing illustrated in FIG. 14, in time sequence from the upper side to the lower side illustrated in FIG. 14, and illustrates one example of the live-view display based on the image quality determination. In FIG. 17, the 'image to be determined' is an image relating to the image data for one frame acquired in step 401 of FIG. 15 or an image relating to the image data for one frame acquired in step 501 of FIG. 16.

As illustrated in FIG. 17, in accordance with the still-image photographing processing illustrated in FIG. 14, during the parallel processes insteps 302, 303, and 304 before the still-image exposure or during the parallel processes in steps 308 and 309 after the still-image exposure, the live-view display determination is performed (see the right side illustrated in FIG. 17) and an image that is brighter than the target brightness is not displayed. Specifically, in this case, the live-view display is blacked out.

In the still-image photographing processing illustrated in FIG. 14, the determination processing is performed after the image data for one frame capable of the live-view display is acquired. Therefore, as compared to the still-image photographing processing (see FIG. 5) according to the first embodiment, the live-view display is delayed, but the above delay is alleviated with the use of the image processing IC 104 and the Bµ com 110 having a faster processing speed.

Further, in the camera according to the second embodiment, the following modification is possible.

In an image capable of the live-view display, for example, a correctable image may be corrected using an image quality adjustment. The above correction can be realized, for example, by temporarily changing the gamma curve.

Figure 18:
FIG. 18 illustrates one example of the live-view display based on the image quality determination in a modification according to the second embodiment.

FIG. 18 illustrates one example of the live-view display based on the image quality determination in the case of adopting the above modification. Further, FIG. 18 corresponds to the images illustrated on the right side of FIG. 17. In FIG. 18, the 'corrected image' indicates an image in which the correctable image is corrected by the image quality adjustment in the image capable of the live-view display. According to the above modification, for example, it is possible to further shorten the image disappearance time as compared to the second embodiment.

Further, the image data generally has brightness data for each pixel, and the brightness is converted using a predetermined table to thereby adjust the brightness.

Figure 19:
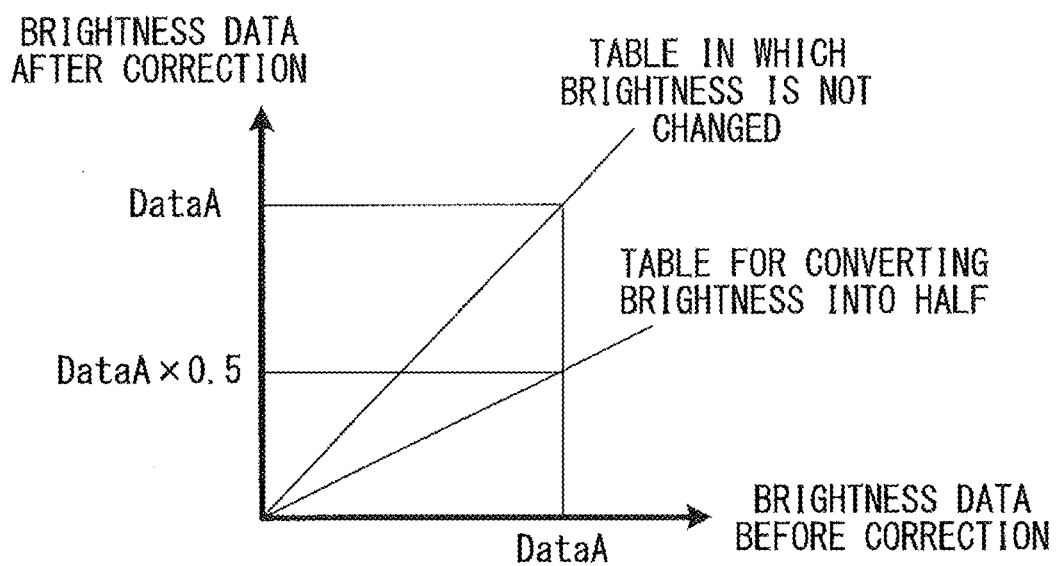
FIG. 19 illustrates one example of a conversion table for brightness.

FIG. 19 illustrates one example of the conversion table.

As illustrated in FIG. 19, the conversion table to be used is selected to thereby determine the brightness data after the correction corresponding to the brightness data before the correction. For example, the conversion table for converting the brightness into half is used and thereby the correction for converting the brightness into half is possible.

In the above modification, for example, a curve of the gamma table used in the case of generating an image from the imaging output (output of the image pickup device 102 and the image pickup device drive IC 103) should just be changed so that the image becomes underexposed.

In this modification, the live-view display is more delayed for an image correction to be performed as compared to the second embodiment. However, the above delay is alleviated with the use of the image processing IC 104 and the Bµ com 110 having a faster processing speed.

As described above, according to each of the above-described embodiments (including the modifications), an advantageous effect is exerted wherein a live-view display can be performed in which the subject is easy to track during the continuous photographing.

As described above, the present invention is not directly limited to the above-described embodiments, and components may be modified and embodied without departing from the spirit and scope of the present invention in the implementation stage. Also, by suitably combining a plurality of components disclosed in the above-described embodiments, it is possible to form various inventions. For example, several components of all the components described in the embodiments may be deleted. Further, the components may be suitably combined across different embodiments.

What is claimed is:

1. A camera comprising:
   an image pickup device configured to receive a light flux passing through a photographing lens and convert the light flux into an electric signal;
   a display device configured to perform a live-view display on the basis of the electric signal output from the image pickup device;
   an aperture driving actuator configured to adjust a light amount passing through the photographing lens;
   a lens microcomputer configured to control the aperture driving actuator and report an operation condition of the aperture driving actuator; and
   a body microcomputer configured to control a stop timing of the live-view display performed before an exposure at a time of a still-image photography on the display device in accordance with the operation condition of the aperture driving actuator, reported by the lens microcomputer, at the time of the still-image photography or in accordance with a brightness of an image based on an output of the image pickup device.

2. The camera according to claim 1, further comprising a lens driving actuator configured to adjust a focus position of the photographing lens, wherein
   the lens microcomputer is further configured to control the lens driving actuator and report an operation condition of the lens driving actuator,
   the body microcomputer is configured to control the stop timing of the live-view display performed before the exposure at the time of the still-image photographing on the display device in accordance with the operation conditions, reported by the lens microcomputer, of the aperture driving actuator and the lens driving actuator at the time of the still-image photography or in accordance with the brightness of the image based on the output of the image pickup device.

3. A camera comprising:
   an image pickup device configured to receive a light flux passing through a photographing lens and convert the light flux into an electric signal;
   a display device configured to perform a live-view display on the basis of the electric signal output from the image pickup device;
   an aperture driving actuator configured to adjust a light amount passing through the photographing lens;
   a lens microcomputer configured to control the aperture driving actuator and report an operation condition of the aperture driving actuator; and
   a body microcomputer configured to control a start timing of the live-view display performed after an exposure at a time of a still-image photography on the display device in accordance with the operation condition of the aperture driving actuator, reported by the lens microcomputer, at a time of the still-image photography or in accordance with a brightness of an image based on an output of the image pickup device.

4. The camera according to claim 3, further comprising a lens driving actuator configured to adjust a focus position of the photographing lens, wherein
   the lens microcomputer is further configured to control the lens driving actuator and report an operation condition of the lens driving actuator, and
   the body microcomputer is configured to control the start timing of the live-view display performed after the exposure at the time of the still-image photography on the display device in accordance with the operation conditions, reported by the lens microcomputer, of the aperture driving actuator and the lens driving actuator at the time of the still-image photography or in accordance with the brightness of the image based on the output of the image pickup device.

5. The camera according to claim 1, wherein
   the body microcomputer is configured to control the stop timing of the live-view display performed before the exposure at the time of the still-image photographing on the display device in accordance with the operation condition, reported by the lens microcomputer, of the aperture driving actuator and the lens driving actuator at the time of the still-image photography, and
   the operation condition is an operation condition such that an aperture value during the exposure at the time of the still-image photography is greater than or equal to an aperture value at the time of the live-view display.

6. The camera according to claim 2, wherein
   the operation condition is an operation condition such that a driving amount of the lens driving actuator is smaller than or equal to a predetermined amount and the aperture value during the exposure at the time of the still-image photography is greater than or equal to the aperture value at the time of the live-view display.

7. The camera according to claim 1, wherein
   the operation condition is an operation condition such that a value obtained by adding an offset value to the aperture value during the exposure at the time of the still-image photography is greater than or equal to the aperture value at the time of the live-view display.

8. The camera according to claim 7, wherein
   the offset value is a value based on a gamma curve of the live-view display.

9. The camera according to claim 7, wherein
   the offset value is stored in advance in a storage unit.

10. The camera according to claim 7, further comprising an operation device configured to accept an operation of a user, wherein
    the offset value is set in accordance with an operation of the operation device by the user.

11. The camera according to claim 3, wherein
    the body microcomputer is configured to control the start timing of the live-view display performed after the exposure at the time of the still-image photographing on the display device in accordance with the operation condition, reported by the lens microcomputer, of the aperture driving actuator and the lens driving actuator at the time of the still-image photography, and
    the operation condition is an operation condition such that an aperture value during the exposure at the time of the still-image photography is greater than or equal to an aperture value at the time of the live-view display.

12. The camera according to claim 4, wherein
the operation condition is an operation condition such that
a driving amount of the lens driving actuator is smaller than or equal to a predetermined amount and the aperture value during the exposure at the time of the still-image photography is greater than or equal to the aperture value at the time of the live-view display.

13. The camera according to claim 3, wherein
the operation condition is an operation condition such that
a value obtained by adding an offset value to the aperture value during the exposure at the time of the still-image photography is greater than or equal to the aperture value at the time of the live-view display.

14. The camera according to claim 13, wherein
the offset value is a value based on a gamma curve of the live-view display.

15. The camera according to claim 13, wherein
the offset value is stored in advance in a storage unit.

16. The camera according to claim 13, further comprising
an operation device configured to accept an operation of a user, wherein
the offset value is set in accordance with an operation of the operation device by the user.

* * * * *